United States Patent
Amouie et al.

(10) Patent No.: US 12,462,362 B2
(45) Date of Patent: *Nov. 4, 2025

(54) MACHINE-LEARNING FRAMEWORK FOR DETECTING DEFECTS OR CONDITIONS OF RAILCAR SYSTEMS

(71) Applicant: Norfolk Southern Corporation, Atlanta, GA (US)

(72) Inventors: Mahbod Amouie, Atlanta, GA (US); Evan T. Gebhardt, Atlanta, GA (US); Gongli Duan, Snellville, GA (US); Myles Grayson Akin, Marietta, GA (US); Wei Liu, Manlius, NY (US); Tianchen Wang, Atlanta, GA (US); Mayuresh Manoj Sardesai, Atlanta, GA (US); Ilya A. Lavrik, Atlanta, GA (US)

(73) Assignee: Norfolk Southern Corporation, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/315,176

(22) Filed: May 10, 2023

(65) Prior Publication Data

US 2024/0070834 A1 Feb. 29, 2024

Related U.S. Application Data

(63) Continuation of application No. 17/962,971, filed on Oct. 10, 2022, now Pat. No. 11,663,711, which is a
(Continued)

(51) Int. Cl.
*G06T 7/00* (2017.01)
*B61L 27/57* (2022.01)
*G06F 18/214* (2023.01)

(52) U.S. Cl.
CPC ............ *G06T 7/0002* (2013.01); *B61L 27/57* (2022.01); *G06F 18/214* (2023.01);
(Continued)

(58) Field of Classification Search
CPC ......... G06T 7/0002; G06T 2207/20081; G06T 2207/30232; G06T 2207/30248; B61L 27/57; G06K 9/6256
See application file for complete search history.

(56) References Cited

U.S. PATENT DOCUMENTS

| 5,677,533 A | 10/1997 | Yaktine et al. |
| 6,637,703 B2 | 10/2003 | Matheson et al. |

(Continued)

FOREIGN PATENT DOCUMENTS

| CN | 110494861 A | 11/2019 |
| EP | 3404611 A1 | 11/2018 |

OTHER PUBLICATIONS

Hu Y., et al., "Exposure: A White-Box Photo Post-Processing Framework," ACM Transactions on Graphics, vol. 37, No. 2, Article 26, Publication date: May 2018, 17 Pages.

(Continued)

*Primary Examiner* — Qian Yang
(74) *Attorney, Agent, or Firm* — Bradley Arant Boult Cummings LLP; Daniel E. Sineway, Esq.

(57) ABSTRACT

A computer-implemented method in which one or more processing devices perform operations may include obtaining a field image of a railcar collected from a field camera system and applying a machine-learning algorithm to the field image to generate a machine-learning algorithm output. The method may also include performing a post-processing operation on the machine-learning algorithm output to generate a filtered machine-learning algorithm output. Further,
(Continued)

the method may include detecting a defect of the railcar using the filtered machine-learning algorithm output.

23 Claims, 20 Drawing Sheets

Related U.S. Application Data continuation of application No. 17/549,499, filed on Dec. 13, 2021, now Pat. No. 11,468,551, which is a continuation-in-part of application No. 16/938,102, filed on Jul. 24, 2020, now Pat. No. 11,507,779.

(52) U.S. Cl.
CPC .............. *G06T 2207/20081* (2013.01); *G06T 2207/30232* (2013.01); *G06T 2207/30248* (2013.01)

(56) References Cited

U.S. PATENT DOCUMENTS

| | | | |
|---|---|---|---|
| 6,768,551 | B2 | 7/2004 | Mian et al. |
| 7,238,871 | B1 | 7/2007 | Stroscio |
| 7,328,871 | B2 | 2/2008 | Mace et al. |
| 7,507,965 | B2 | 3/2009 | Lane et al. |
| 7,724,962 | B2 | 5/2010 | Zhu et al. |
| 8,006,559 | B2 | 8/2011 | Mian et al. |
| 8,140,250 | B2 | 3/2012 | Mian et al. |
| 8,296,000 | B2 | 10/2012 | Denny et al. |
| 8,335,606 | B2 | 12/2012 | Mian et al. |
| 9,061,594 | B2 | 6/2015 | Wesche et al. |
| 9,098,739 | B2 | 8/2015 | Dal Mutto et al. |
| 9,134,185 | B2 | 9/2015 | Mian et al. |
| 9,151,681 | B2 | 10/2015 | Arndt et al. |
| 9,296,108 | B2 | 3/2016 | Mian et al. |
| 9,340,219 | B2 | 5/2016 | Gamache et al. |
| 9,349,105 | B2 | 5/2016 | Beymer et al. |
| 9,376,129 | B2 | 6/2016 | Hilleary |
| 9,518,947 | B2 | 12/2016 | Bartonek et al. |
| 9,865,103 | B2 | 1/2018 | Kraeling et al. |
| 9,996,772 | B2 | 6/2018 | Ahmed et al. |
| 10,012,546 | B2 | 7/2018 | Bartonek et al. |
| 10,081,376 | B2 | 9/2018 | Singh |
| 10,136,106 | B2 | 11/2018 | Shubs, Jr. et al. |
| 10,196,078 | B2 | 2/2019 | Shubs, Jr. et al. |
| 10,339,642 | B2 | 7/2019 | Zhu et al. |
| 10,373,073 | B2 | 8/2019 | Kisilev |
| 10,460,208 | B1 | 10/2019 | Atsmon et al. |
| 10,679,046 | B1 | 6/2020 | Black et al. |
| 10,710,615 | B2 | 7/2020 | Georgeson et al. |
| 2010/0238290 | A1 | 9/2010 | Riley et al. |
| 2013/0129188 | A1 | 5/2013 | Zhang et al. |
| 2013/0212107 | A1 | 8/2013 | Uchida |
| 2014/0270548 | A1 | 9/2014 | Kamiya |
| 2015/0238148 | A1 | 8/2015 | Georgescu et al. |
| 2016/0148078 | A1 | 5/2016 | Shen et al. |
| 2016/0358337 | A1 | 12/2016 | Dai et al. |
| 2017/0200092 | A1 | 7/2017 | Kisilev |
| 2018/0349526 | A1 | 12/2018 | Atsmon et al. |
| 2018/0374207 | A1 | 12/2018 | Niculescu-Mizil et al. |
| 2019/0030371 | A1 | 1/2019 | Han |
| 2019/0061791 | A1 | 2/2019 | Yaktine et al. |
| 2019/0094154 | A1 | 3/2019 | Iler |
| 2019/0095753 | A1 | 3/2019 | Wolf et al. |
| 2019/0147586 | A1* | 5/2019 | Ikeda .................... G06T 7/0004 382/157 |
| 2019/0176862 | A1* | 6/2019 | Kumar .................... B61L 27/40 |
| 2019/0235126 | A1 | 8/2019 | Petruk et al. |
| 2019/0367057 | A1 | 12/2019 | Georgeson et al. |
| 2020/0034782 | A1 | 1/2020 | Hsieh et al. |
| 2020/0089998 | A1 | 3/2020 | Zagaynov et al. |
| 2020/0098172 | A1 | 3/2020 | Atsmon |
| 2020/0104644 | A1 | 4/2020 | Sato |
| 2020/0311944 | A1 | 10/2020 | Cao et al. |
| 2020/0320346 | A1 | 10/2020 | Nikolenko et al. |
| 2020/0369302 | A1* | 11/2020 | Mesher .................. G01B 11/25 |
| 2021/0064934 | A1 | 3/2021 | Swaminathan et al. |
| 2021/0089771 | A1 | 3/2021 | Fu et al. |
| 2021/0183052 | A1 | 6/2021 | Ikeda et al. |
| 2021/0225005 | A1 | 7/2021 | Vartakavi et al. |
| 2021/0342975 | A1* | 11/2021 | Liu ........................... G06T 5/50 |

OTHER PUBLICATIONS

Park D., et al., "A Single Multi-Task Deep Neural Network with Post-Processing for Object Detection with Reasoning and Robotic Grasp Detection," 2020 IEEE International Conference on Robotics and Automation (ICRA), May 31-Aug. 31, 2020, 7 Pages.

Non-Final Office Action for U.S. Appl. No. 17/549,496 dated Jun. 21, 2024, 21 pages.

Final Office Action for U.S. Appl. No. 17/549,496, mailed Oct. 11, 2024, 33 Pages.

\* cited by examiner

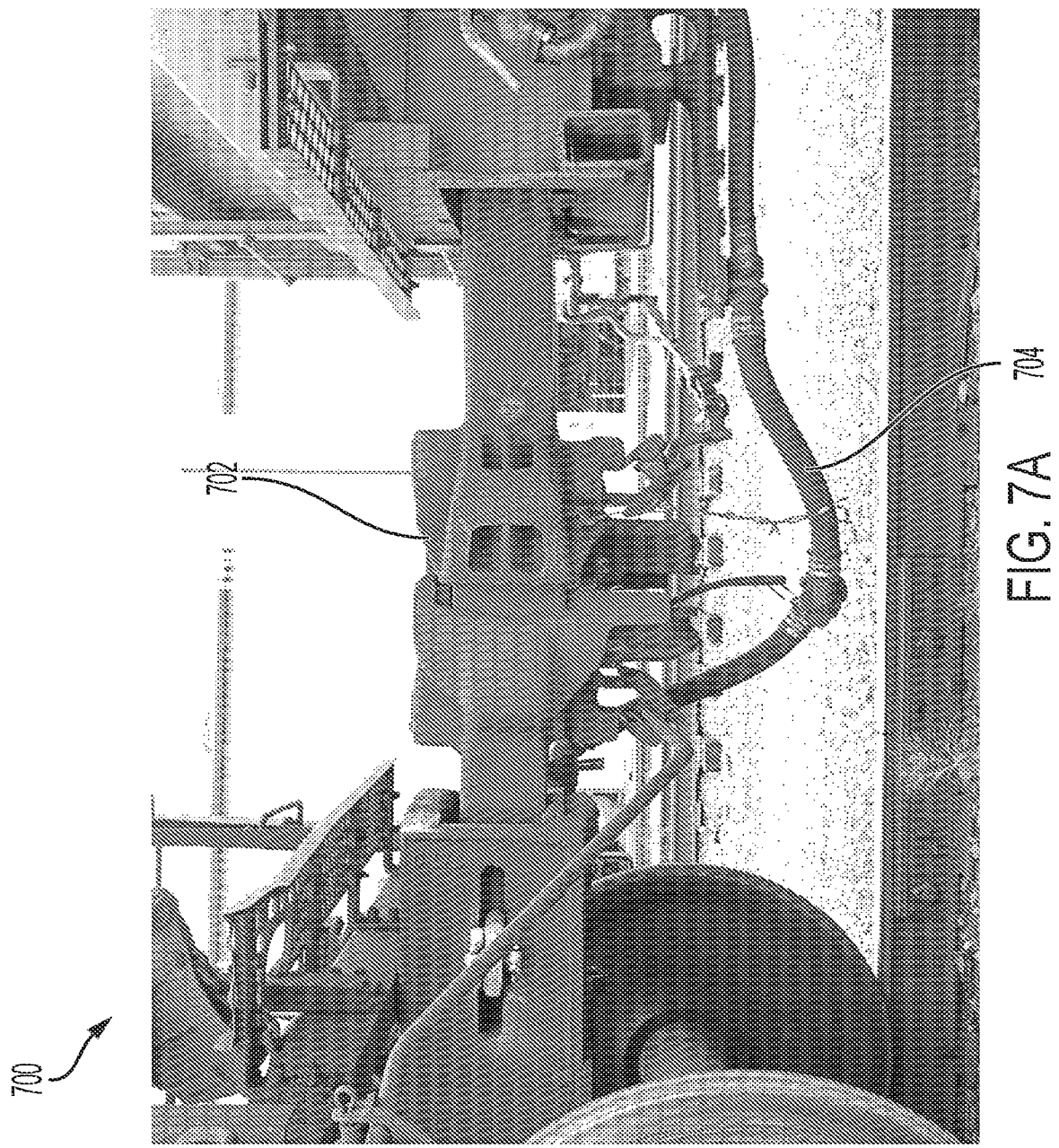

MACHINE-LEARNING FRAMEWORK FOR DETECTING DEFECTS OR CONDITIONS OF RAILCAR SYSTEMS

CROSS REFERENCE TO RELATED APPLICATIONS

This application is a continuation patent application of, and claims the benefit of and priority to, U.S. Non-Provisional patent application Ser. No. 17/962,971, filed on Oct. 10, 2022, and entitled "MACHINE-LEARNING FRAMEWORK FOR DETECTING DEFECTS OR CONDITIONS OF RAILCAR SYSTEMS," which is a continuation patent application of, and claims the benefit of and priority to, U.S. Non-Provisional patent application Ser. No. 17/549,499, filed on Dec. 13, 2021, and entitled "MACHINE-LEARNING FRAMEWORK FOR DETECTING DEFECTS OR CONDITIONS OF RAILCAR SYSTEMS," which is a continuation-in-part patent application of, and claims the benefit of and priority to, U.S. Non-Provisional patent application Ser. No. 16/938,102, filed on Jul. 24, 2020, and entitled "TWO-STATE DEEP LEARNING FRAMEWORK FOR DETECTING THE CONDITION OF RAIL CAR COUPLER SYSTEMS," the disclosure of which are incorporated by reference in their entirety as if the same were fully set forth herein.

TECHNICAL FIELD

Examples set forth in the present disclosure relate to machine learning. More particularly, but not by way of limitation, the present disclosure describes machine-learning frameworks for detecting defects or conditions of railcar systems.

BACKGROUND

Railcars of trains may be transported under extreme conditions, such as extreme temperatures and vibrations. The extreme conditions may affect the integrity of some components of the railcar. For example, the extreme conditions experienced by railcars may lead to wear of various components of the railcar. The components may include wheels, railcar coupler securement systems, air hoses, braking systems, axles, springs, or any other components of the railcar. Visual inspection of worn components on the railcars may be labor intensive and may only be available while a train is stopped at a station. In some examples, the components may become dislodged due to railcar vibration and temperature changes. Visual inspection of these components may be labor intensive and may only be available while a train is stopped at a station. Therefore, there exists a long felt but unresolved need for systems, methods, and apparatuses that improve railcar component inspection by automatically analyzing the components of the railcars both during transport of the railcars and while the railcars are stationary, such as at a rail yard.

BRIEF SUMMARY

The present systems, methods, and devices relate generally to machine learning, and more particularly to machine-learning frameworks for detecting defects or conditions of railcar systems. In one example, the systems, methods, and devices discussed in the present disclosure aim to improve expensive railcar component inspection techniques. The present embodiments include novel techniques that rely on machine-learning models to identify defects or conditions in a railcar as the railcar is transported as part of a train. In an example, and as will be discussed herein, a field camera system may obtain field images as a train passes the field camera system. A predictive model system may apply machine-learning algorithms to the field images to detect defects or conditions of components of the railcars. In an example, upon detection of a defect, the predictive model system may initiate remediation operations to address the defect or condition of the railcar. The presently disclosed techniques may limit cost associated with manual inspection of railcars and enhance inspection accuracy.

According to a first aspect, a computer-implemented method in which one or more processing devices perform operations includes: A) obtaining a field image of a railcar collected from a field camera system; B) applying a machine-learning algorithm to the field image to generate a machine-learning algorithm output; C) performing a post-processing operation on the machine-learning algorithm output to generate a filtered machine-learning algorithm output; and D) detecting a defect of the railcar using the filtered machine-learning algorithm output.

According to a further aspect, the computer-implemented method of the first aspect, wherein the machine-learning algorithm includes a first machine-learning algorithm and a second machine-learning algorithm, and wherein the operation of applying the machine-learning algorithm to the field image to generate the machine-learning algorithm output includes: A) applying the first machine-learning algorithm to the field image to generate a first machine-learning algorithm output; and B) applying the second machine-learning algorithm to the first machine-learning algorithm output to generate the machine-learning algorithm output.

According to a further aspect, the computer-implemented method of the first aspect or any other aspect, wherein the first machine-learning algorithm includes a localization algorithm, and wherein the second machine-learning algorithm includes a classification algorithm, a pose estimation algorithm, a line segment detection algorithm, or a segmentation algorithm.

According to a further aspect, the computer-implemented method of the first aspect or any other aspect, wherein the defect includes a missing, broken, or displaced component of the railcar.

According to a further aspect, the computer-implemented method of the first aspect or any other aspect, wherein the component includes an E-type railcar coupler, an F-type railcar coupler, an air hose, or a combination thereof.

According to a further aspect, the computer-implemented method of the first aspect or any other aspect, wherein the machine-learning algorithm includes a localization algorithm, a classification algorithm, a pose estimation algorithm, a line segment detection algorithm, a segmentation algorithm, or a combination thereof.

According to a further aspect, the computer-implemented method of the first aspect or any other aspect, wherein the machine-learning algorithm includes a set of machine-learning algorithms, and wherein the operations further include: A) determining a set of field scores, wherein each field score of the set of field scores corresponds to one machine-learning algorithm of the set of machine-learning algorithms; and B) determining a composite field score of the set of field scores by determining a most common field score of the set of field scores, wherein the composite field score includes an indication of the defect of the railcar.

According to a further aspect, the computer-implemented method of the first aspect or any other aspect, wherein the composite field score includes a binary condition associated with a single object detectable in the field image by the machine-learning algorithm.

According to a second aspect, a system includes: a processor; and a non-transitory computer-readable medium having instructions stored thereon, the instructions executable by the processor for performing operations including: A) obtaining a field image of a railcar collected from a field camera system; B) applying a first machine-learning algorithm to the field image to generate a first machine-learning algorithm output; C) applying a second machine-learning algorithm to the first machine-learning algorithm output to generate a second machine-learning algorithm output; D) performing a post-processing operation on the second machine-learning algorithm output to generate a filtered machine-learning algorithm output; and E) detecting a defect of the railcar using the filtered machine-learning algorithm output.

According to a further aspect, the system of the second aspect, wherein the first machine-learning algorithm includes a localization algorithm, and wherein the second machine-learning algorithm includes a classification algorithm, a pose estimation algorithm, a line segment detection algorithm, or a segmentation algorithm.

According to a further aspect, the system of the second aspect or any other aspect, wherein the operation of performing the post-processing operation includes filtering the second machine-learning algorithm output to remove data that is not relevant to detection of the defect of the railcar.

According to a further aspect, the system of the second aspect or any other aspect, wherein the defect includes a missing, broken, cracked, worn, or displaced component of the railcar.

According to a further aspect, the system of the second aspect or any other aspect, wherein the operations further include: A) determining a set of field scores including three or more field scores, wherein at least one field score of the set of field scores corresponds to the filtered machine-learning algorithm output; and B) determining a composite field score of the set of field scores by determining a most common field score of the set of field scores, wherein the composite field score includes an indication of the defect of the railcar.

According to a further aspect, the system of the second aspect or any other aspect, wherein the composite field score includes a binary condition associated with a single object detectable in the field image.

According to a third aspect, a non-transitory computer-readable storage medium having program code that is stored thereon, the program code executable by one or more processing devices for performing operations including: A) obtaining a field image of a railcar collected from a field camera system; B) applying a machine-learning algorithm to the field image to generate a machine-learning algorithm output; C) performing a post-processing operation on the machine-learning algorithm output to generate a filtered machine-learning algorithm output; and D) detecting a defect of the railcar using the filtered machine-learning algorithm output.

According to a further aspect, the non-transitory computer-readable storage medium of the third aspect, wherein the machine-learning algorithm includes a first machine-learning algorithm and a second machine-learning algorithm, and wherein the operation of applying the machine-learning algorithm to the field image to generate the machine-learning algorithm output includes: A) applying the first machine-learning algorithm to the field image to generate a first machine-learning algorithm output; and B) applying the second machine-learning algorithm to the first machine-learning algorithm output to generate the machine-learning algorithm output.

According to a further aspect, the non-transitory computer-readable storage medium of the third aspect or any other aspect, wherein the first machine-learning algorithm includes a localization algorithm, and wherein the second machine-learning algorithm includes a classification algorithm, a pose estimation algorithm, a line segment detection algorithm, or a segmentation algorithm.

According to a further aspect, the non-transitory computer-readable storage medium of the third aspect or any other aspect, wherein the machine-learning algorithm includes a localization algorithm, a classification algorithm, a pose estimation algorithm, a line segment detection algorithm, a segmentation algorithm, or a combination thereof.

According to a further aspect, the non-transitory computer-readable storage medium of the third aspect or any other aspect, wherein the operation of performing the post-processing operation includes filtering the machine-learning algorithm output to remove data that is not relevant to detection of the defect of the railcar.

According to a further aspect, the non-transitory computer-readable storage medium of the third aspect or any other aspect, wherein the defect of the railcar includes a broken, missing, or displaced component of a railcar coupler securement system.

According to a fourth aspect, a computer-implemented method in which one or more processing devices perform operations includes: A) obtaining a plurality of raw images depicting railcars; B) generating a plurality of synthetic images using the plurality of raw images; C) generating a plurality of secondary images using the plurality of raw images and the plurality of synthetic images, wherein the plurality of secondary images are generated by applying image augmenting operations to the plurality of raw images and the plurality of synthetic images; D) curating a first training dataset including a set of images from the plurality of raw images, the plurality of synthetic images, and the plurality of secondary images; and E) training a first machine-learning algorithm with the first training dataset.

According to a further aspect, the method of the fourth aspect, further including: A) curating a second training dataset that is different from the first training dataset, wherein the second training dataset includes a second set of images from (i) the plurality of raw images, (ii) the plurality of synthetic images, and (iii) the plurality of secondary images; and B) training a second machine-learning algorithm with the second training dataset.

According to a further aspect, the method of the fourth aspect or any other aspect, wherein the second machine-learning algorithm is a different category of machine-learning algorithm from the first machine-learning algorithm.

According to a further aspect, the method of the fourth aspect or any other aspect, further including: A) obtaining a field image of an operating railcar collected from a field camera system; B) applying the first machine-learning algorithm to the field image to generate a first machine-learning algorithm output; C) applying the second machine-learning algorithm to the first machine-learning algorithm output to generate a second machine-learning algorithm output; D) performing a post-processing operation on the second machine-learning algorithm output to generate a filtered machine-learning algorithm output; and E) detecting a defect of the operating railcar using the filtered machine-learning algorithm output.

According to a further aspect, the method of the fourth aspect or any other aspect, further including: in response to detecting the defect of the operating railcar, initiating a remediation operation to resolve the defect of the operating railcar.

According to a further aspect, the method of the fourth aspect or any other aspect, wherein the image augmenting operations include random blurring operations, random brightening operations, upsampling operations, shift scale rotation operations, random noise operations, or a combination thereof.

According to a further aspect, the method of the fourth aspect or any other aspect, wherein the first machine-learning algorithm is trained to detect a defect of the operating railcar, and wherein the defect includes a broken, missing, or displaced component of a coupler securement system.

According to a further aspect, the method of the fourth aspect or any other aspect, wherein the coupler securement system includes an E-type coupler, an F-type coupler, an air hose, or a combination thereof.

According to a further aspect, the method of the fourth aspect or any other aspect, wherein the first machine-learning algorithm includes a localization algorithm, a classification algorithm, a pose estimation algorithm, a line segment detection algorithm, or a segmentation algorithm.

According to a fifth aspect, a system includes: a processor; and a non-transitory computer-readable medium having instructions stored thereon, the instructions executable by the processor for performing operations including: A) obtaining a plurality of raw images depicting railcars; B) generating a plurality of synthetic images using the plurality of raw images; C) generating a plurality of secondary images using the plurality of raw images and the plurality of synthetic images, wherein the plurality of secondary images are generated by applying image augmenting operations to the plurality of raw images and the plurality of synthetic images; D) curating a first training dataset including a set of images from the plurality of raw images, the plurality of synthetic images, and the plurality of secondary images; and E) training a first machine-learning algorithm with the first training dataset.

According to a further aspect, the system of the fifth aspect, wherein the operations further include: A) curating a second training dataset that is different from the first training dataset, wherein the second training dataset includes a second set of images from (i) the plurality of raw images, (ii) the plurality of synthetic images, and (iii) the plurality of secondary images; and B) training a second machine-learning algorithm with the second training dataset.

According to a further aspect, the system of the fifth aspect or any other aspect, wherein the second machine-learning algorithm is a different category of machine-learning algorithm from the first machine-learning algorithm.

According to a further aspect, the system of the fifth aspect or any other aspect, wherein the operations further include: A) obtaining a field image of an operating railcar collected from a field camera system; B) applying the first machine-learning algorithm to the field image to generate a first machine-learning algorithm output; C) applying the second machine-learning algorithm to the first machine-learning algorithm output to generate a second machine-learning algorithm output; D) performing a post-processing operation on the second machine-learning algorithm output to generate a filtered machine-learning algorithm output; and E) detecting a defect of the operating railcar using the filtered machine-learning algorithm output.

According to a further aspect, the system of the fifth aspect or any other aspect, wherein the operations further include: in response to detecting the defect of the operating railcar, initiating a remediation operation to resolve the defect of the operating railcar.

According to a further aspect, the system of the fifth aspect or any other aspect, wherein the image augmenting operations include random blurring operations, random brightening operations, upsampling operations, shift scale rotation operations, random noise operations, or a combination thereof.

According to a sixth aspect, a non-transitory computer-readable storage medium having program code that is stored thereon, the program code executable by one or more processing devices for performing operations including: A) obtaining a plurality of raw images depicting railcars; B) generating a plurality of synthetic images using the plurality of raw images; C) generating a plurality of secondary images using the plurality of raw images and the plurality of synthetic images, wherein the plurality of secondary images are generated by applying image augmenting operations to the plurality of raw images and the plurality of synthetic images; D) curating a first training dataset including a set of images from the plurality of raw images, the plurality of synthetic images, and the plurality of secondary images; E) training a first machine-learning algorithm with the first training dataset; F) curating a second training dataset that is different from the first training dataset, wherein the second training dataset includes a second set of images from (i) the plurality of raw images, (ii) the plurality of synthetic images, and (iii) the plurality of secondary images; and G) training a second machine-learning algorithm with the second training dataset.

According to a further aspect, the non-transitory computer-readable storage medium of the sixth aspect, wherein the operations further include: A) obtaining a field image of an operating railcar collected from a field camera system; B) applying the first machine-learning algorithm to the field image to generate a first machine-learning algorithm output; C) applying the second machine-learning algorithm to the first machine-learning algorithm output to generate a second machine-learning algorithm output; D) performing a post-processing operation on the second machine-learning algorithm output to generate a filtered machine-learning algorithm output; E) detecting a defect of the operating railcar using the filtered machine-learning algorithm output; and F) in response to detecting the defect of the operating railcar, initiating a remediation operation to resolve the defect of the operating railcar.

According to a further aspect, the non-transitory computer-readable storage medium of the sixth aspect or any other aspect, wherein the image augmenting operations include random blurring operations, random brightening operations, upsampling operations, shift scale rotation operations, random noise operations, or a combination thereof.

According to a further aspect, the non-transitory computer-readable storage medium of the sixth aspect or any other aspect, wherein the first machine-learning algorithm is trained to detect a defect of the operating railcar, and wherein the defect includes a broken, missing, or displaced component of a coupler securement system.

According to a further aspect, the non-transitory computer-readable storage medium of the sixth aspect or any other aspect, wherein the first machine-learning algorithm includes a localization algorithm, a classification algorithm, a pose estimation algorithm, a line segment detection algorithm, or a segmentation algorithm.

These and other aspects, features, and benefits of the claimed embodiments will become apparent from the following detailed written description of embodiments and aspects taken in conjunction with the following drawings, although variations and modifications thereto may be effected without departing from the spirit and scope of the novel concepts of the disclosure.

BRIEF DESCRIPTION OF THE DRAWINGS

Features of the various examples described will be readily understood from the following detailed description, in which reference is made to the figures. A reference numeral is used with each element in the description and throughout the several views of the drawing. When a plurality of similar elements is present, a single reference numeral may be assigned to like elements, with an added lower-case letter referring to a specific element.

The various elements shown in the figures are not drawn to scale unless otherwise indicated. The dimensions of the various elements may be enlarged or reduced in the interest of clarity. The several figures depict one or more implementations and are presented by way of example only and should not be construed as limiting. Included in the drawing are the following figures:

FIGS. 7A and 7B depict an exemplary railcar air hose connection, according to one aspect of the present disclosure;

DETAILED DESCRIPTION

Figure 1:
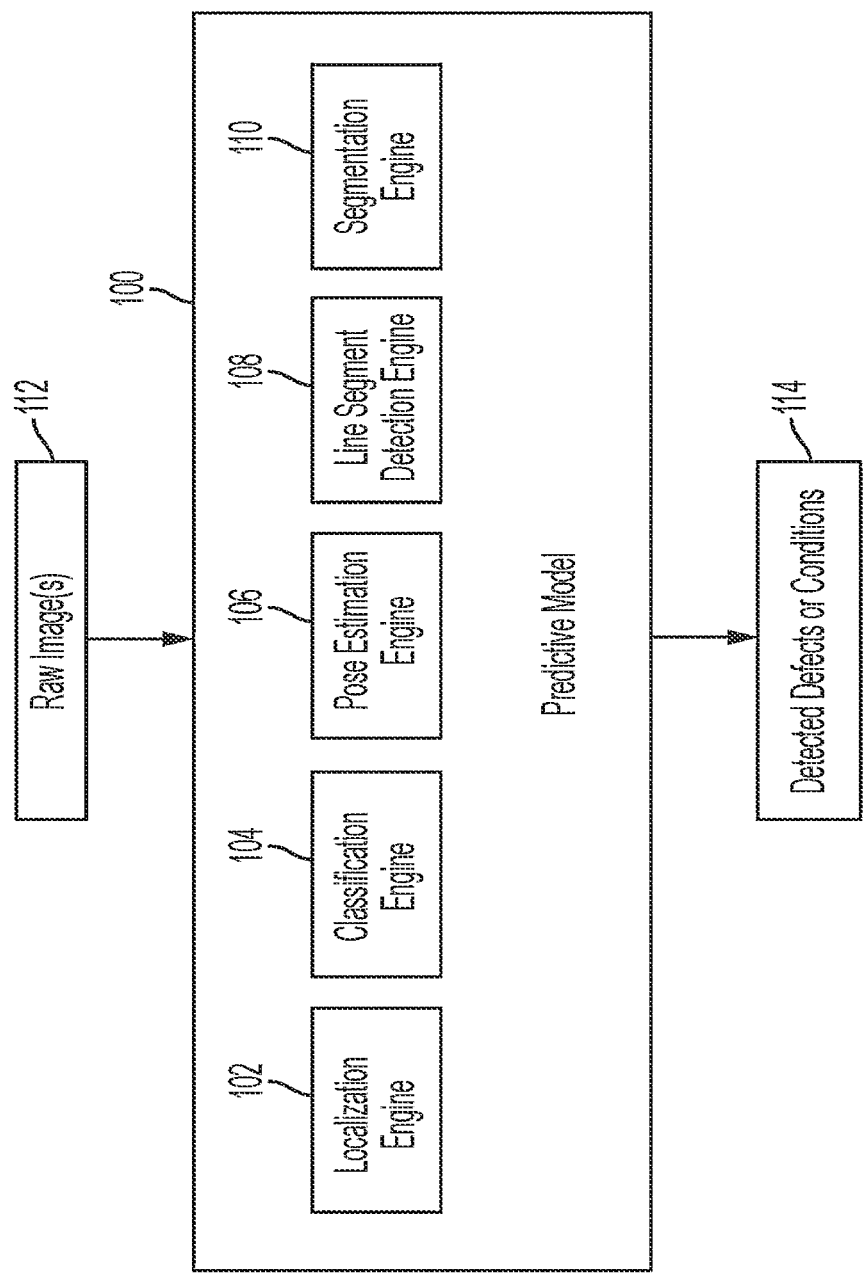
FIG. 1 is a block diagram of an example predictive model, according to one aspect of the present disclosure.

Various implementations and details are described with reference to examples including methods of generating predictive models for identifying defects or conditions in images associated with railcars. The following detailed description includes systems, methods, techniques, instruction sequences, and computing machine program products illustrative of examples set forth in the disclosure. Numerous details and examples are included for the purpose of providing a thorough understanding of the disclosed subject matter and its relevant teachings. Those skilled in the relevant art, however, may understand how to apply the relevant teachings without such details. Aspects of the disclosed subject matter are not limited to the specific devices, systems, and methods described because the relevant teachings can be applied or practiced in a variety of ways. The terminology and nomenclature used herein is for the purpose of describing particular aspects only and is not intended to be limiting. In general, well-known instruction instances, protocols, structures, and techniques are not necessarily shown in detail.

Additional objects, advantages and novel features of the examples will be set forth in part in the following description, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

Deep learning refers to a class of machine-learning methods that are based on or modeled after artificial neural networks. An artificial neural network is a computing system made up of a number of simple, highly interconnected processing elements (nodes), which process information by their dynamic state response to external inputs. A large artificial neural network might have hundreds, thousands, millions, or even billions of nodes.

A convolutional neural network (CNN) is a type of neural network that may be applied to analyze visual images, including digital photographs and video. The connectivity pattern between nodes in a CNN is modeled after the organization of the human visual cortex, which includes individual neurons arranged to respond to overlapping regions in a visual field.

Aspects of the present disclosure relate to the training of machine-learning algorithms and models with a plurality of training datasets and implementing the trained machine-learning algorithms to detect defects or conditions associated with railcars. Without limiting the scope of the disclosure, various aspects are described through a discussion of various examples, including the training and implementation of a predictive model to analyze the contents of digital photographic images.

Example implementations of the present disclosure are directed toward a predictive model for analyzing digital images of railcars to autonomously detect the state of railcar components. In some examples, the predictive model may identify components that are worn, missing, displaced, broken, or cracked. In one example, the railcar components analyzed by the predictive model may include railcar couplings or couplers that connect rolling stock (e.g., all types of wheeled railcars, powered and unpowered) in a train. Additional examples of railcar components analyzed by the predictive model may include worn wheels, broken or cracked axles, peaked air hoses, worn springs, or any other railcar components that may be visible in a photographic image of the railcar.

In one embodiment, an image collection mechanism (e.g., cameras positioned near the rails, cameras positioned on drone systems that are deployable to the rails, etc.) captures images, such as photographic images, of the railcar components while a train is passing at track speed. These images can be used to supplement the periodic manual inspection of railcar components. In some examples, camera systems deployed in the field are subject to harsh outdoor conditions, including the mechanical shock from passing trains, debris, and extreme weather conditions.

The predictive model may be trained to identify defects or conditions of railcar components that are depicted in the images collected by the camera systems. The camera systems may be positioned to collect images of the railcar from various angles. For example, the angles may include side views of the railcar showing the wheels, the body of the railcar, the coupling system between the railcars, air hoses, or any other railcar components visible in a side view. The angles may also include a view of an undercarriage of the railcar to show axles, springs, the undercarriage portion of the body of the railcar, air hoses, braking systems, or any other railcar components visible in the view of the undercarriage. The predictive model may be applied to the images collected from the camera system to identify the components of the railcar that are worn, missing, displaced, broken, or cracked.

Reference now is made in detail to the examples illustrated in the accompanying drawings and discussed below.

FIG. 1 is a block diagram of an example predictive model 100, according to one example of the present disclosure. The predictive model 100 may include multiple machine-learning engines. For example, the predictive model 100, as shown, includes a localization engine 102, a classification engine 104, a pose estimation engine 106, a line segment detection engine 108, and a segmentation engine 110. Each of the engines 102-110, in some examples, can include one or more trained machine-learning models that perform the operation of the engine. For example, the trained machine-learning models associated with the localization engine 102 may include multiple localization models that are trained to detect regions of interest in a set of raw images 112 analyzed by the predictive model 100.

The raw images 112 that are analyzed by the predictive model 100 may be collected by camera systems positioned along a railway. In an embodiment, camera boxes located at waysides, or other locations, along the railway can be implemented to capture the raw images 112 of railcars as the trains pass the camera boxes. The raw images 112 are may be captured using a high-speed lens such that the camera system can capture several raw images 112 of a particular portion of a railcar as the train passes. Additionally, the camera boxes may be positioned at several angles such that different cameras capture the raw images 112 of different portions of the railcar as the train passes. In an embodiment, the camera systems may be triggered by a triggering mechanism (e.g., motion sensor) on the track. In some embodiments, the camera systems may take pictures for the entire length of the train as the train passes the camera systems.

In some embodiments, the raw images 112 collected by the camera systems may also be used as images for training the predictive model 100. For example, the trained machine-learning models of the engines 102-110 may be trained using the raw images 112, synthetic images, and augmented images, as discussed below with respect to FIG. 9. Thus, as more of the raw images 112 are collected, more images may be used in training datasets for the predictive model 100 to improve the robustness of the predictive model 100.

In some examples, the engines 102-110 may be used in multiple stages to identify a set of detected defects or conditions 114 of railcar components. For example, when the predictive model 100 detects missing or broken components, the localization engine 102 may detect regions of interest of the raw images 112, and the classification engine 104 may subsequently classify components of the regions of interest to detect the missing or broken components. In some examples, the localization engine 102 may be trained to identify regions of the raw images 112 that are most likely to include a broken component, and the classification engine 104 may be trained to accurately identify a broken component in the raw images 112, if present. In additional examples, the engines 102-110 may be used in individual stages. For example, when the predictive model 100 detects displaced components of the raw images 112, the pose estimation engine 106, the line segment detection engine 108, or the segmentation engine 110 may be used individually. Other multi-stage combinations of the engines 102-110 may also be used to detect the defects or conditions 114.

In some examples, the predictive model 100 may receive the raw images 112 and analyze the raw images for a pre-determined list of defects or conditions. In additional examples, the predictive model 100 may use the segmentation engine 110 to perform a semantic segmentation operation that identifies particular components of the raw images 112, such as coupler types between railcars, wheels, axles, air hoses, springs, or any other railcar components that are depicted in the raw images 112. Based on the semantic segmentation, the predictive model 100 may determine a particular defect or condition or a set of defects or conditions that are most likely to be present in the raw images 112. Using the identified particular defect or condition or the set of defects or conditions most likely to be present in the raw images 112, the predictive model 100 may select an engine or set of engines that are capable of identifying the particular defect or condition or the set of defects or conditions.

In one or more examples, each of the engines 102-110 may include one or more machine-learning algorithms or models that perform various operations to identify features of the raw images 112. For example, the localization machine-learning models of the localization engine 102 may be trained to identify one or more regions of interest of the raw images 112. In such an example, the localization machine-learning models may be trained to isolate features of the raw images 112 that are relevant to detecting defects or conditions while removing features from the raw images 112 that are not relevant to detecting defects or conditions. For example, the localization machine-learning models may create a crop of an image that displays the portions of the image that are determined to be relevant to detecting defects or conditions of a railcar.

In an additional example, the classification machine-learning models of the classification engine 104 may be trained to classify the raw images 112. In an example, the classification machine-learning models may be trained to identify the presence of a particular component in the raw images 112. When the classification machine-learning models fail to locate the particular component in the image, the predictive model 100 may determine, as a defect or condition 114, that the particular component of a railcar is missing or broken.

The pose estimation machine-learning models of the pose estimation engine 106 may be trained to detect poses of particular components depicted in the raw images 112. For example, a pose of some components on the railcars and depicted in the raw images 112 may be analyzed by the pose estimation machine-learning models. Based on the detected pose as compared with an expected pose, the pose estimation engine 106 may identify, as a defect or condition 114, that a component of the railcar is defective.

Further, the line segment detection machine-learning models of the line segment detection engine 108 and the segmentation machine-learning models of the segmentation engine 110 may be trained to detect displaced components of the railcars depicted in the raw images 112. For example, the line segment detection machine-learning model may be used to identify when line segments of the raw images 112 that correspond to railcar components are displaced. Likewise, the segmentation machine-learning models may be used to identify components in the raw images 112. Thus, when an expected component is missing, the line segment detection engine 108 or the segmentation engine 110 may identify, as a defect or condition 114, that a component of the railcar is displaced or missing.

Figure 2:
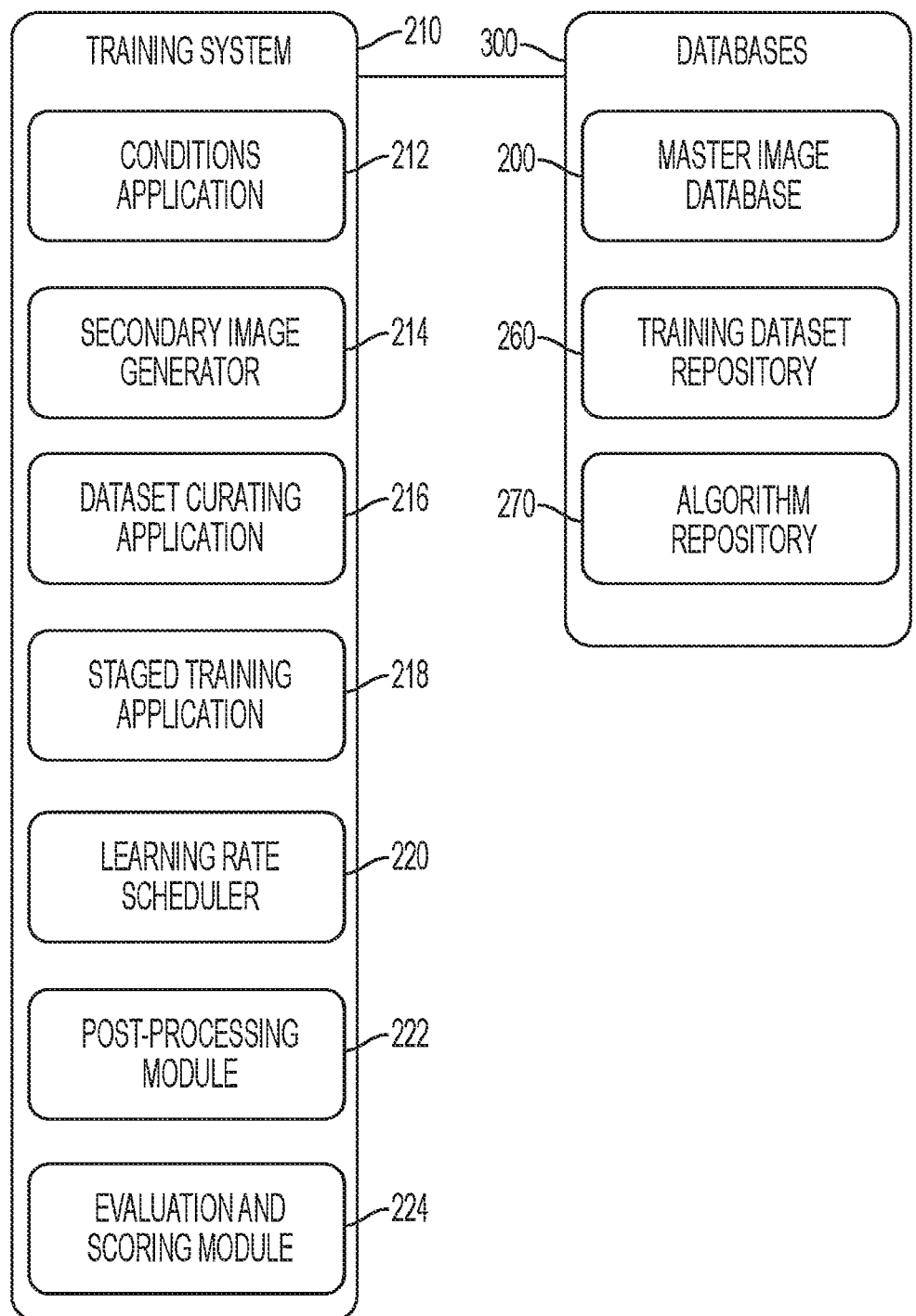
FIG. 2 is a block diagram of an example training system used to manage and control training of algorithms, according to one aspect of the present disclosure.

FIG. 2 is a block diagram of an example training system 210 to train the algorithms and models of the predictive model 100, according to one example of the present disclosure. The training system 210, as shown, is communicatively coupled to a database 300, including a master image database 200, a training dataset repository 260, and an algorithm repository 270.

The training system 210 may include a conditions application 212. The conditions application 212 may facilitate the process of identifying, categorizing, and otherwise processing entry of conditions associated with each raw image 112. In other words, the conditions application 212 may tag the raw images 112 with image information relevant to the training process of the machine-learning algorithms. For example, the conditions application 212 may tag the raw images 112 with a classification of a railcar (e.g., primary features of railcars displayed in the raw images 112). Further, the conditions application 212 may tag the raw images 112 with features of interest, such as the locations within the raw images 112 of varying components of the railcars. In an embodiment, the conditions application 212 may identify that the raw images 112 include missing, broken, cracked, or displaced components of a railcar. The conditions application 212 may also tag the raw images 112 with other types of information that may be relevant to the training process of the predictive model 100.

The training system 210 may also include a secondary image generator 214. The secondary image generator 214 may facilitate the process of generating secondary images for use in training the machine-learning algorithms. Secondary images, in some examples, may be generated by adjusting images (e.g., decreasing resolution, reducing size, rotating, flipping, shifting, etc.), augmenting images (e.g., blurring, brightening, adding noise, etc.) and duplicating images (also known as upsampling). By generating secondary images through augmentation of the raw images 112, the training system 210 may cultivate additional images that are used to train the machine-learning algorithms. Further, the augmented secondary images may provide a mechanism for the training system 210 to train the machine-learning algorithms by simulating the raw images 112 collected in less than ideal conditions (e.g., a dirty lens, in fog, in adverse weather conditions, etc.).

Additionally, the training system 210, in some examples, includes a dataset curating application 216 that manages the operation of curating the training datasets. Curating a training dataset may involve achieving a balanced dataset. To achieve the balanced dataset, additional augmented images may be desired to simulate the raw images 112 collected in less than ideal conditions. The augmented images may be generated through generation of additional secondary images by applying augmentation algorithms to the raw images 112, as discussed below with respect to FIG. 5. Curating may be an iterative process that is applied at varying degrees of granularity and managed by the dataset curating application 216.

Training of a selected algorithm or model, in some examples, may proceed in stages and may be controlled by a staged training application 218. For example, the staged training application 218 presents portions of the training set to a machine-learning algorithm in stages, and the staged training application 218 may present a validation set of images between stages to evaluate the progress of the machine-learning algorithm. The staged training application 218, together with a learning rate scheduler 220, may regulate and modulate the presentation of the sets within a training dataset to facilitate the training in an efficient and controlled manner.

The staged training application 218, in some examples, includes or is communicatively coupled to the learning rate scheduler 220. In the context of machine learning, the learning rate is a parameter or algorithm that determines the step size at each iteration or stage of training. The learning rate scheduler 220 works in conjunction with the staged training application 218 to avoid over-fitting, under-fitting, and other statistical phenomena that lead to poor training outcomes. Over-fitting describes a situation in which the algorithm corresponds so closely to a particular set of data that, when presented with new data, it will not produce accurate predictions. When over-fitting occurs, or begins to occur, the learning rate scheduler 220 will pause the training, between stages, and the staged training application 218 will use one of the validation sets (from the selected training dataset) to conduct an interim evaluation of the progress of the machine-learning algorithm.

The learning rate scheduler 220 includes a number of adjustable parameters, such as step size, the time between iterations, and the mathematical distance between nodes in an artificial network. In this aspect, the learning rate scheduler 220 includes an interface or similar tool for adjusting the parameters to accommodate a particular training task. For example, the learning rate scheduler 220, including a set of parameters specifically for localization, may be used during training of a localization machine-learning algorithm. The learning rate scheduler 220, including a different set of parameters tailored specifically to other classes of machine-learning models, may be used during training of the other classes of machine-learning models. In a related aspect, the parameters for a particular learning rate scheduler 220 may be adjusted during training at any time (e.g., between stages, after using a validation set) in order to fine-tune the speed and progress of the training.

A post-processing module 222, in some examples, may include one or more post-processing tools or techniques, such as de-noising and other quality enhancements. In some examples, the machine-learning algorithm during training will identify multiple regions of interest in the same image, each having its own confidence value. In such cases, the post-processing module 222 may compare the multiple regions and select the one with the higher confidence value. In other words, a localization algorithm may output several candidate regions of interest based on, for example, a component that the localization algorithm is trained to identify. Each of the candidate regions of interest may include a confidence value, which provides an indication of the likelihood of the candidate region of interest being relevant to the component being identified. The post-processing module 222 may assess the confidence values to pare down the candidate regions of interest into one or more of the most likely regions of interest to be relevant to the component being identified.

In some embodiments, where the confidence values may be relatively equivalent, the identification of multiple regions of interest may be accurate. Some types of railcar coupling systems, for example, may include multiple bolts and/or nuts, each of which may be located in a different region of a raw image 112. In such cases, the identification of multiple regions of interest is accurate and legitimate, and the post-processing module 222 may determine the accuracy based on the similar confidence values.

The post-processing module 222, in some implementations, includes a tool for detecting whether the multiple regions of interest lie along or close to the same or similar plane (e.g., typically, the same vertical plane) in the image. A vertical plane, for example, may be established using pixel coordinates and other reference planes in the image. In this aspect, the post-processing module 222 may approve the identification of multiple regions of interest, each of which may be stored in a record associated with the same raw image 112 in the master image database 200.

An evaluation and scoring module 224 may be implemented by the training system 210 to evaluate the progress of the training operation of the machine-learning models. In some examples, the evaluation and scoring module 224 may generate a score for the accuracy of the machine-learning model. In an example, the score may provide an indication of when the training process is complete.

During the training process of the predictive model 100, the training system 210 may communicate with the databases 300. For example, the databases 300 may include the master image database 200, the training dataset repository 260, and the algorithm repository 270. The master image database 200 may store the raw images 112 collected from the field, any secondary images generated through augmentation of the raw images 112, or any synthetic images generated to provide more material to train the machine-learning algorithms. The training dataset repository 260 may store curated training datasets generated by the dataset curating application 216 and used to train the machine-learning algorithms to identify and assess particular components of the railcar. Additionally, the algorithm repository 270 may store the machine-learning algorithms of the engines 102-110 of the predictive model 100.

Figure 3:
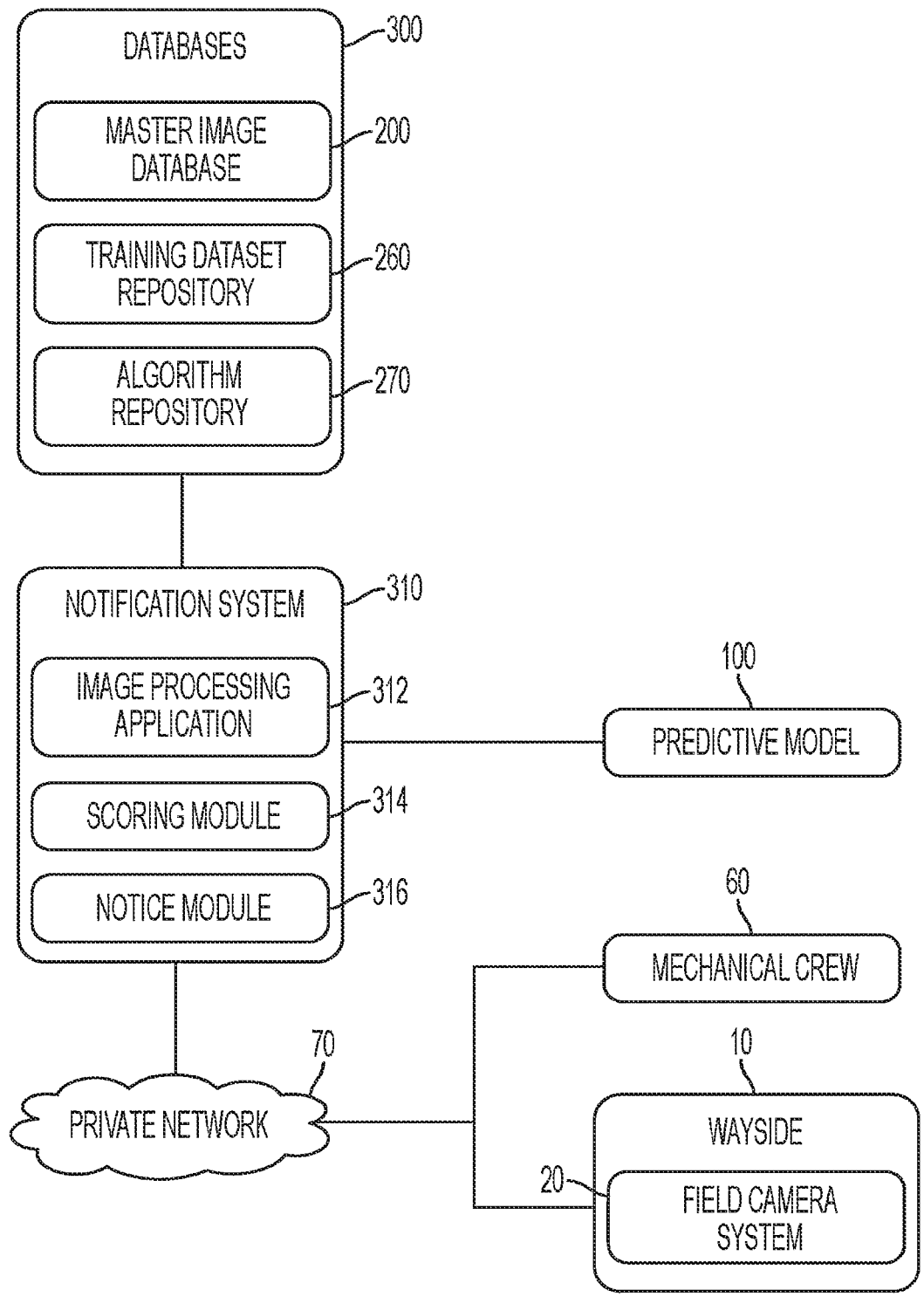
FIG. 3 is a block diagram of an example notification system usable with the predictive model of FIG. 1 to analyze and classify images captured in the field, according to one aspect of the present disclosure.

FIG. 3 is a block diagram of an example detection and notification system 310 for use with the predictive model 100 to analyze and classify images captured in the field, in accordance with some example implementations. The detection and notification system 310, as shown, may be communicatively coupled to one or more databases 300 and to the predictive model 100. The notification system 310, in some examples, includes an image processing application 312, a scoring module 314, and a notice module 316. The notification system 310 may be communicatively coupled to remote equipment located in an area near a railway, known as a wayside 10, and to one or more crews, such as a mechanical crew 60, over a private network 70. A rail network may include one or more data centers, dispatchers, and a number of waysides 10 located in remote areas at or near the edges of the rail network. Each wayside 10 may house a variety of equipment, such as switches, train sensors, timers, weather sensors, communications equipment, and camera systems. The detection and notification system 310, in some implementations, may be communicatively coupled to each wayside 10 that includes a field camera system 20.

The field camera systems 20 deployed in the field may include one or more visible-light cameras that are positioned and oriented to capture images of various components of railcar features. Examples of such cameras include high-resolution digital video graphics array (VGA) cameras having a complementary metal-oxide-semiconductor (CMOS) image sensor. In an example, the VGA cameras may be capable of resolutions of 640p (e.g., 640×480 pixels for a total of 0.3 megapixels), 720p, 1080p, 4K, or any other resolution. Some camera systems can capture high-definition (HD) still images and store them at a resolution of 1642 by 1642 pixels (or greater) and/or capture and record high-definition video at a high frame rate (e.g., thirty to sixty frames per second or more) and store the recording at a resolution of 1216 by 1216 pixels (or greater). Digital images may include a matrix of pixels on a two-dimensional coordinate system that includes an X-axis for horizontal position and a Y-axis for vertical position. Each pixel includes color attribute values (e.g., a red pixel light value, a green pixel light value, and/or a blue pixel light value) and position attributes (e.g., an X-axis value and a Y-axis value). In this aspect, the raw images 112 described herein may be digital images, containing data that is accessible for processing by one or more of the algorithms described herein.

According to one example implementation, the elements shown in FIG. 3 are distributed between and among a plurality of edge servers located near the field camera systems 20. For example, one or more components of the detection and notification system 310 is stored locally, on an edge server, where images captured by the field camera system 20 are processed and scored, as described herein. A wayside 10, in an example, may house an edge server and a field camera system 20. The edge-computing arrangement avoids communication challenges associated with a poor connection to a distant server located remote from the field camera system 20. In this aspect, as described herein, the edge server may be equipped with suitable hardware that is relevant to the operations performed at the edge server, such as a graphics processing unit (GPU) that is particularly well suited to operate the detection and notification system 310.

Figure 4:
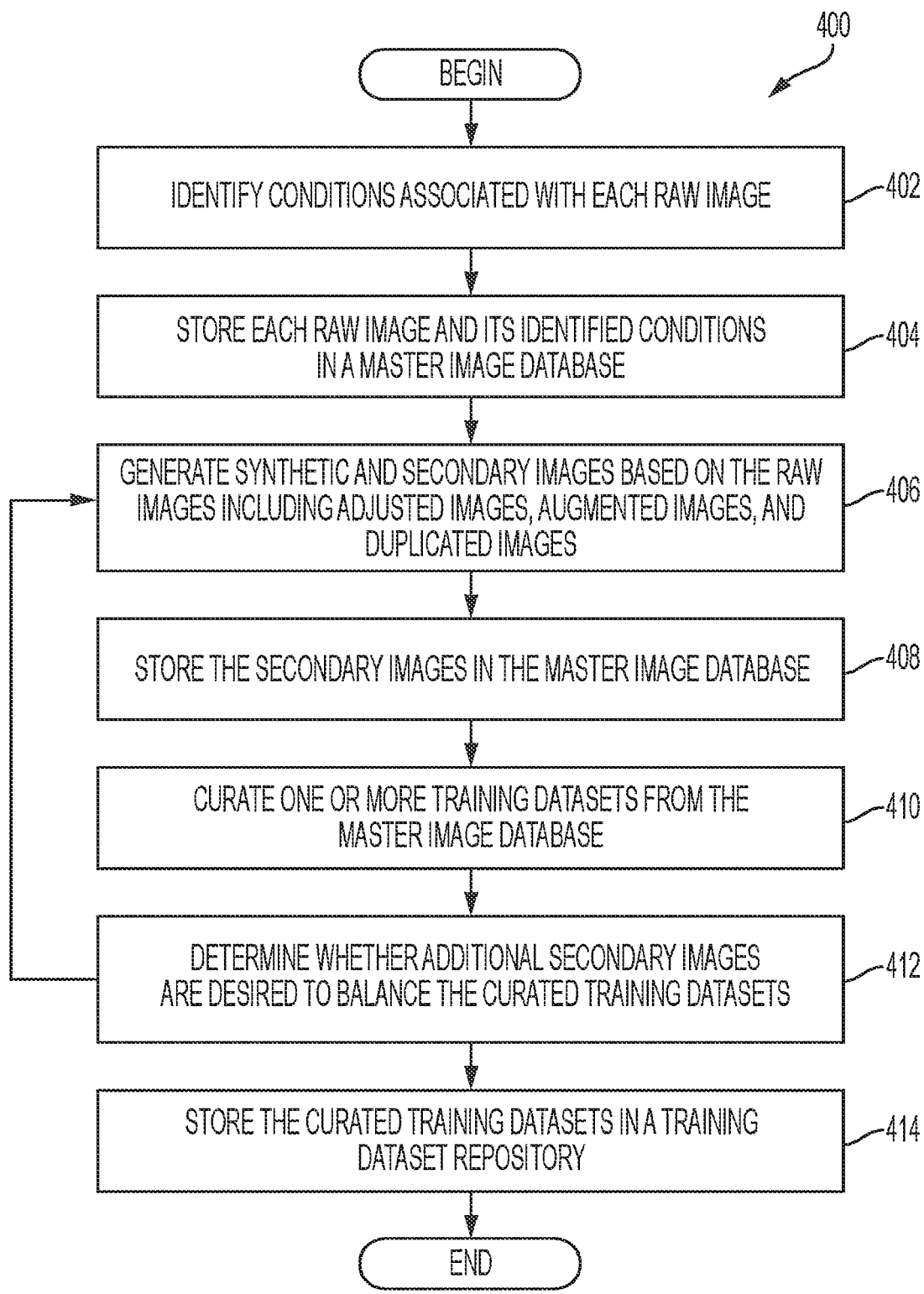
FIG. 4 is a flow chart of a process of curating a plurality of training datasets, according to one aspect of the present disclosure.

FIG. 4 is a flow chart of a process 400 depicting an example method of curating a plurality of training datasets suitable for use with the predictive model 100 described herein, in accordance with some example implementations. The training datasets may include images and related data stored in the master image database 200, as depicted in FIGS. 2 and 3, which, in some implementations, is communicatively coupled to or includes a collection of the raw images 112. According to example implementations that are directed toward railcars and components for the railcars, the raw images 112 may include thousands of images of passing trains which were captured in the field using digital cameras. One or more of the blocks shown and described may be performed simultaneously, in a series, in an order other than shown and described, or in conjunction with additional blocks. Some blocks may be omitted or, in some applications, repeated.

At block 402, the process 400 involves identifying one or more conditions associated with each of the raw images 112. According to example implementations that are directed toward railcars and components, the raw images 112 may include thousands of images of the railcars of passing trains that were captured in the field using digital cameras. One or multiple images may be captured, from different angles, of the railcars where specific components of the railcars are expected to be located. The set of raw images 112 may include many thousands of images.

The raw images 112 captured by cameras in the field, in some examples, include little or no information about each image. In many types of datasets for training machine-learning algorithms (for diagnosing medical conditions, for example), the raw data might include only an image (e.g., an x-ray) and a result (e.g., a tumor is present or absent). Using an image alone, without also knowing the result, can have limited use as a training dataset because there is limited information to verify (during training) if the algorithm is making an accurate prediction.

The conditions identified with the raw images 112, in some implementations, include conditions about the subject of the photograph (e.g., the coupler type, whether expected cotter pins, bolts, and/or nuts are present or absent, or any other conditions about the subject of the photograph), geo-spatial site conditions (e.g., location, date, time), environmental conditions (e.g., weather, ambient lighting), and camera settings (e.g., camera type, exposure time, lens condition). In some example implementations, the conditions 110 about the subject of the photograph (e.g., the coupler, wheels, axles, air hoses, springs, or any other railcar components) is binary. In other words, the conditions 110 include a present or absent indicator for a component such as a bolt, nut, and/or cotter key.

The selection and entry of data about the conditions may improve a depth and level of detail supporting each image selected for use in one of the training datasets. The conditions, such as defects, environmental conditions, etc., may be identified by observation and selected manually or, in some implementations, a computer can extract one or more conditions associated with each image. As shown in FIG. 2, the conditions application 212 of the training system 210 may facilitate the process of identifying, categorizing, and otherwise processing the entry of conditions associated with each raw image 112.

At block 404, the process 400 involves storing each raw image 112 together with one or more conditions is stored in the master image database 200. The conditions application 212, in some examples, manages the storing process.

At block 406, the process 400 involves generating synthetic and secondary images to increase the quantity of images available in the training dataset. As shown in FIG. 2, a secondary image generator 214 facilitates the process of generating synthetic and secondary images. In some examples, certain railcar defects or conditions are infrequently seen in images collected in the field by the field camera system 20. To enhance training of machine-learning algorithms, these defects or conditions may be replicated by the secondary image generator 214 as the synthetic images. Additionally, the secondary images, in some examples, may be generated by adjusting raw images and synthetic images (e.g., decreasing resolution, reducing size, rotating, flipping, shifting, etc.), augmenting raw images and synthetic images (e.g., blurring, brightening, adding noise, etc.), and duplicating raw images and synthetic images (also known as up-sampling). In some examples, adjusting and augmenting images may simulate defects or conditions of the field camera system 20. For example, a dirty lens of a field camera system 20 located along rails at the wayside 10 may be simulated by adding noise to some of the secondary images. In another example, vibration of the camera system 20 may be simulated by blurring the raw images 112, the secondary images, or the synthetic images. Other augmentation techniques may also be used to simulate other conditions experienced by the camera system 20 that may impact the quality of the images obtained by the camera system 20.

High-resolution images may include greater detail but processing the high-resolution images is computationally expensive and time consuming. Low-resolution images may lack sufficient detail for useful evaluation. In this aspect, this operation of generating the secondary images may include re-sizing the raw images 112 to generate secondary images having a resolution that is relatively lower but still sufficiently high for identifying railcar defects or conditions within the secondary images. In this aspect, the secondary image generator 214 includes a re-sizing application or routine. In some examples, a single raw image 112 may be the basis of many secondary images having different resolutions.

Further, the region of interest may not always be centered or within the field of view of the raw images 112. Thus, in various examples, this operation of generating the secondary images may also include shifting and/or rotating the raw images 112 to generate a secondary image whereby the region of interest is centered within the field of view of the raw images. In this aspect, the secondary image generator 214 may include a rotation and/or shifting application or routine. A single raw image, in some implementations, may be the basis of many secondary images having different rotations.

Augmenting images may deliberately generate secondary images that have one or more imperfections, in varying degrees. In operation, as described herein, many of the raw images 112 to be processed will include a variety of imperfections. Using augmented images in the training stages will make the algorithms and models more resilient and more capable of handling imperfect images. In some examples, random blurring and brightening may be used to generate supplemental images. Random blurring, for example, applies a random degree of blur to an image. Random brightening adjusts the contrast to a random degree. In this aspect, the secondary image generator 214 includes one or more random blurring and brightening routines.

Consistent with aspects of the present disclosure, the process of generating secondary images may include selecting and applying augmentation techniques to generate images that simulate or mimic one or more of the conditions 110 associated with the raw images 112. In addition to random blurring, for example, the process of generating secondary images may include selecting a degree of blur that will simulate an environmental condition, such as fog, or a site condition, such as debris on the camera. In addition to random brightening, the process of generating secondary images in some implementations may include region-based, dynamic brightening, in which one or more selected portions of a raw image 112 are brightened or darkened. For example, the contrast may be adjusted for a region of interest in the image near where a specific component is expected to be located, in order to simulate various lighting conditions that might impact the capacity of the algorithms and models to identify and detect the components in an image. The secondary image generator 214 may include one or more settings associated with the random blurring and brightening routines in order to facilitate and execute these augmentation techniques.

The process of generating secondary images may also include generating duplicate images, including duplicates of raw images 112 and/or other secondary images. For example, the collection of raw images 112 may include relatively few images in which an expected component is absent from the raw image. Generating duplicates of such images may be used such that, when curating a training dataset 250 (as described below at block 410) the master image database 200 may include a sufficient number of secondary images 150 in which the expected component is absent. Accordingly, the secondary image generator 214 includes a duplication routine governed by one or more control settings.

At block 408, the process 400 involves storing the secondary images in the master image database 200. Consistent with aspects of the present disclosure, each secondary image may be associated with the original raw image 112 on which it is based. The storing process may be controlled and executed by the secondary image generator 214.

At block 410, the process 400 involves curating training datasets using the images stored in the master image database 200. One goal of curating a training dataset is to present the model with a set of images that closely represents the variety of conditions likely to occur in the real world. In this manner, the model is trained and ready to process new images from the field that were captured under real-world conditions. In an example, a random set of images may not be usable to effectively train a model. As shown in FIG. 2, the training system 210, in some implementations, includes a dataset curating application 216 that manages the operation of curating the training datasets, as described herein.

Curating a training dataset may be accomplished in conjunction with the other operations described with respect to the process 400, including identifying conditions (e.g., at block 402) and generating synthetic and secondary images (e.g., at block 406). For example, to achieve a balanced dataset, additional blurred images may be desired, which may involve generating additional secondary images by applying random or purposeful blurring. Curating is an iterative process that is applied at varying degrees of granularity and managed by the dataset curating application 216.

At block 412, the process 400 involves determining whether additional secondary images are desired to improve the balance of images in any of the curated training datasets. The determination, as well as other aspects of the process, may be performed by a computer. In another example, purposeful blurring may be applied to generate secondary images that simulate a particular environmental condition, such as fog, for curating a training dataset that is usable to effectively train the algorithms and models to process raw images captured in foggy conditions of various densities. Consistent with aspects of the present disclosure, the process of curating at block 410 may generate hundreds or thousands of training datasets, each containing thousands of images (raw images and secondary images). If additional secondary images are desired, the process 400 returns to block 406 for the generation of additional secondary images.

A single curated training dataset, in some examples, may include a training set, a validation set, and a testing set. The training set may be used to train the algorithms and models. The validation set may be a set used between stages of training. For example, the validation set may be used to conduct an interim evaluation of the results and measure how well the algorithm is improving. In some examples, the validation set may reveal over-fitting, under-fitting, or other undesirable trends in the results that may prompt an early stop. The testing set, sometimes referred to as a hold-out set, may be used to evaluate the model after a number of training stages.

In some examples, the training set may include approximately eighty percent of the images in the training dataset, the validation set may include approximately ten percent of the images in the training dataset; and the testing set may include approximately ten percent of the images in the training dataset. This distribution may be adjusted, as needed. Other distributions among the sets may be appropriate for training particular algorithms or models. The sets may contain one or more images common to the other sets. In other words, the sets need not be subsets of the training dataset.

If additional secondary images are not desired, then, at block 414, the process 400 involves storing the curated training datasets in the training dataset repository 260.

Figure 5:
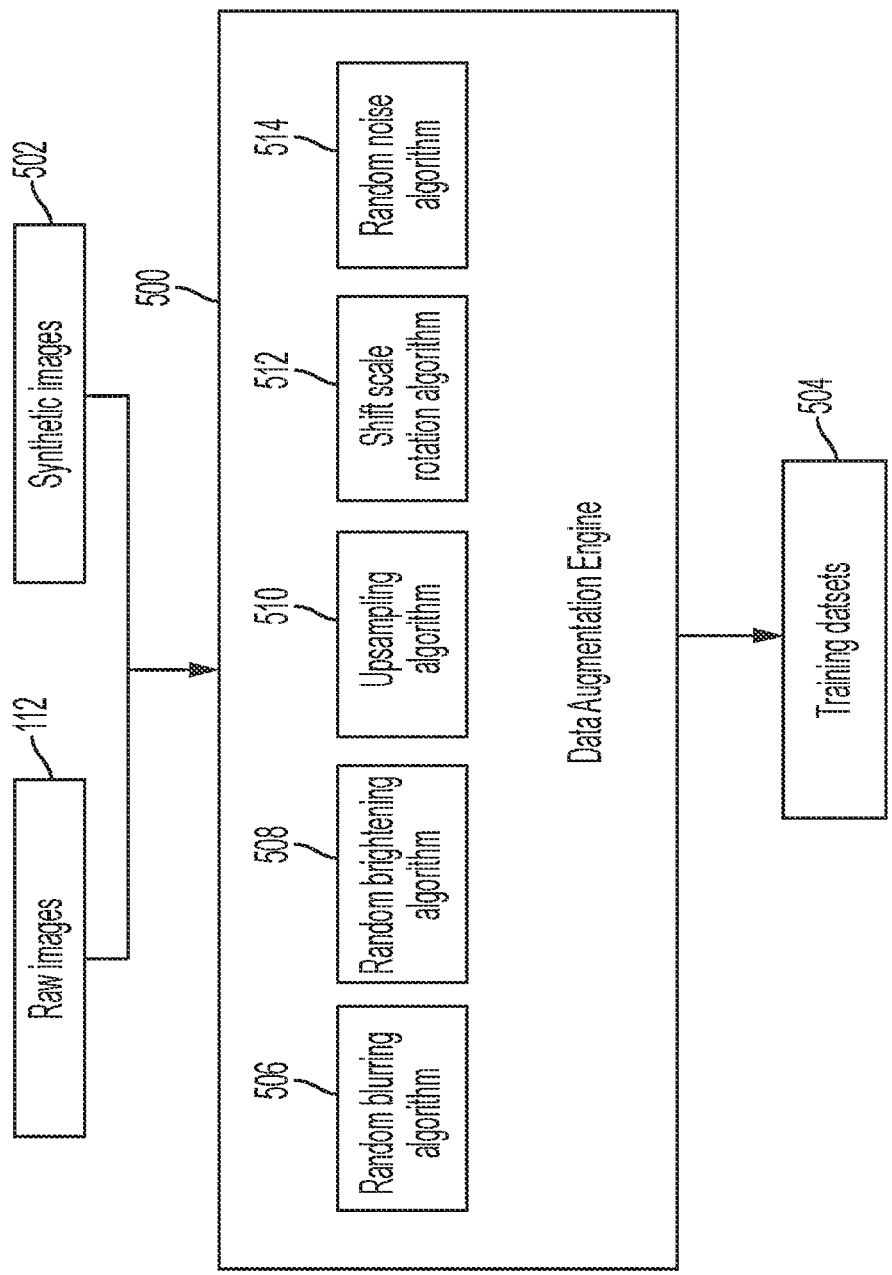
FIG. 5 is a block diagram of an example data augmentation engine, according to one aspect of the present disclosure.

FIG. 5 is a block diagram of an example data augmentation engine 500, according to one aspect of the present disclosure. The data augmentation engine 500 may be applied to raw images 112 and synthetic images 502 to generate training datasets 504, as discussed above with respect to FIG. 4. In some examples, certain railcar defects or conditions are infrequently seen in images collected in the field by the field camera system 20. To enhance training of machine-learning algorithms, these defects or conditions may be replicated in the synthetic images 502. The synthetic images 502 may be generated using automated approaches, such as Generative Artificial Neural Networks (GANNs), or using other manual approaches.

In an example, the data augmentation engine 500 may include a random blurring algorithm 506 that randomly blurs portions of the raw images 112 and the synthetic images 502 to generate secondary images. Additionally, the data augmentation engine 500 may include a random brightening algorithm 508 that randomly brightens portions of the raw images 112 and the synthetic images 502 to generate secondary images. Further, the data augmentation engine 500 may include an upsampling algorithm 510 that generates additional copies of the raw images 112 and the synthetic images 502 to generate secondary images. In some examples, the upsampling algorithm 510 may be applied to a limited number of the raw images 112 and the synthetic images 502 to increase a number of images in the training datasets 504 that have a particular defect or condition that is valuable to the training operation.

The data augmentation engine 500 may also include a shift scale rotation algorithm 512 that shifts, scales, and/or rotates the raw images 112 and the synthetic images 502 to generate additional secondary images. Additionally, the data augmentation engine 500 may include a random noise algorithm that adds random noise to the raw images 112 and the synthetic images 502 to generate secondary images. In some examples, the training datasets 504 include pluralities of raw images 112, synthetic images 502, and secondary images generated by the data augmentation engine 500.

While the data augmentation engine 500 is described as including the algorithms 506-514, other algorithms may also be implemented by the data augmentation engine 500 to further generate secondary images. For example, dynamic algorithms, rather than random algorithms, may also be applied to the raw images 112 and the synthetic images 502 to generate the secondary images for use in the training datasets 504. In such an example, the algorithms may dynamically select portions of the images for augmentation. For example, a region of interest of the raw images 112 or the synthetic images 502, such as a particular component of a railcar, may be identified, and the region of interest or the areas surrounding the region of interest may be augmented to generate the secondary images.

Figure 6A:
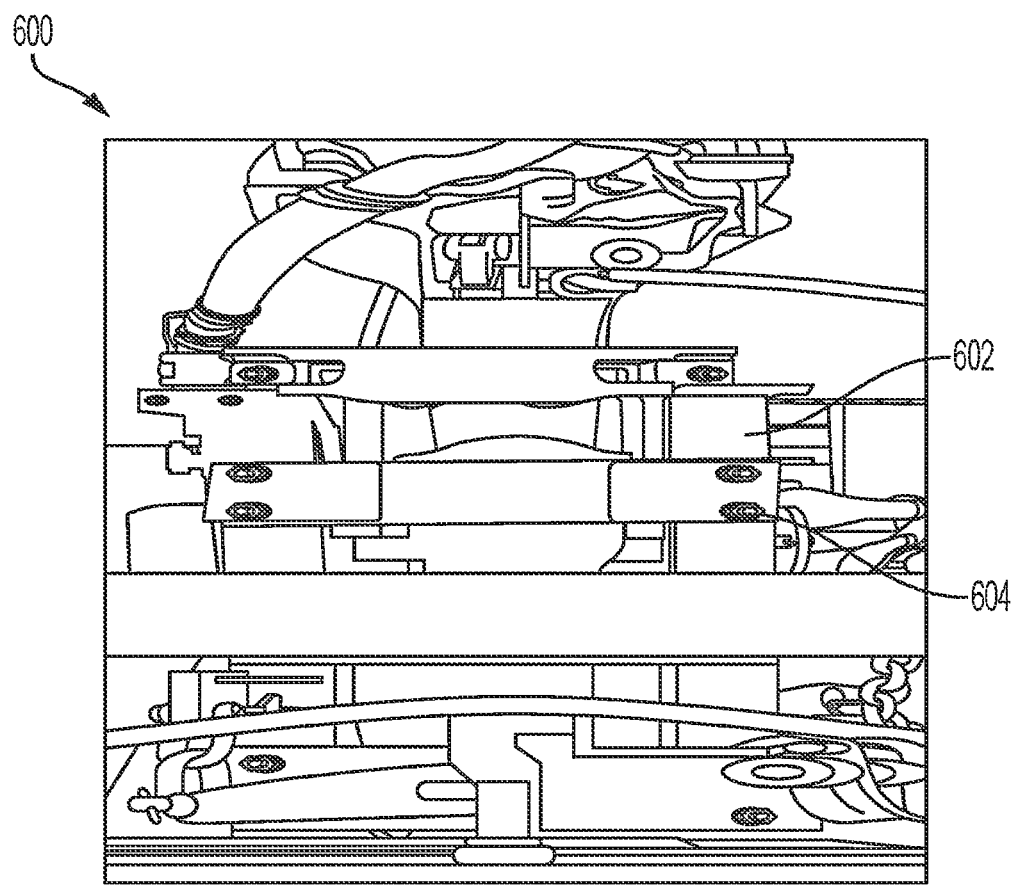
FIGS. 6A and 6B depict exemplary Type F and Type E coupler securement systems for a railcar, according to one aspect of the present disclosure.
Figure 7B:
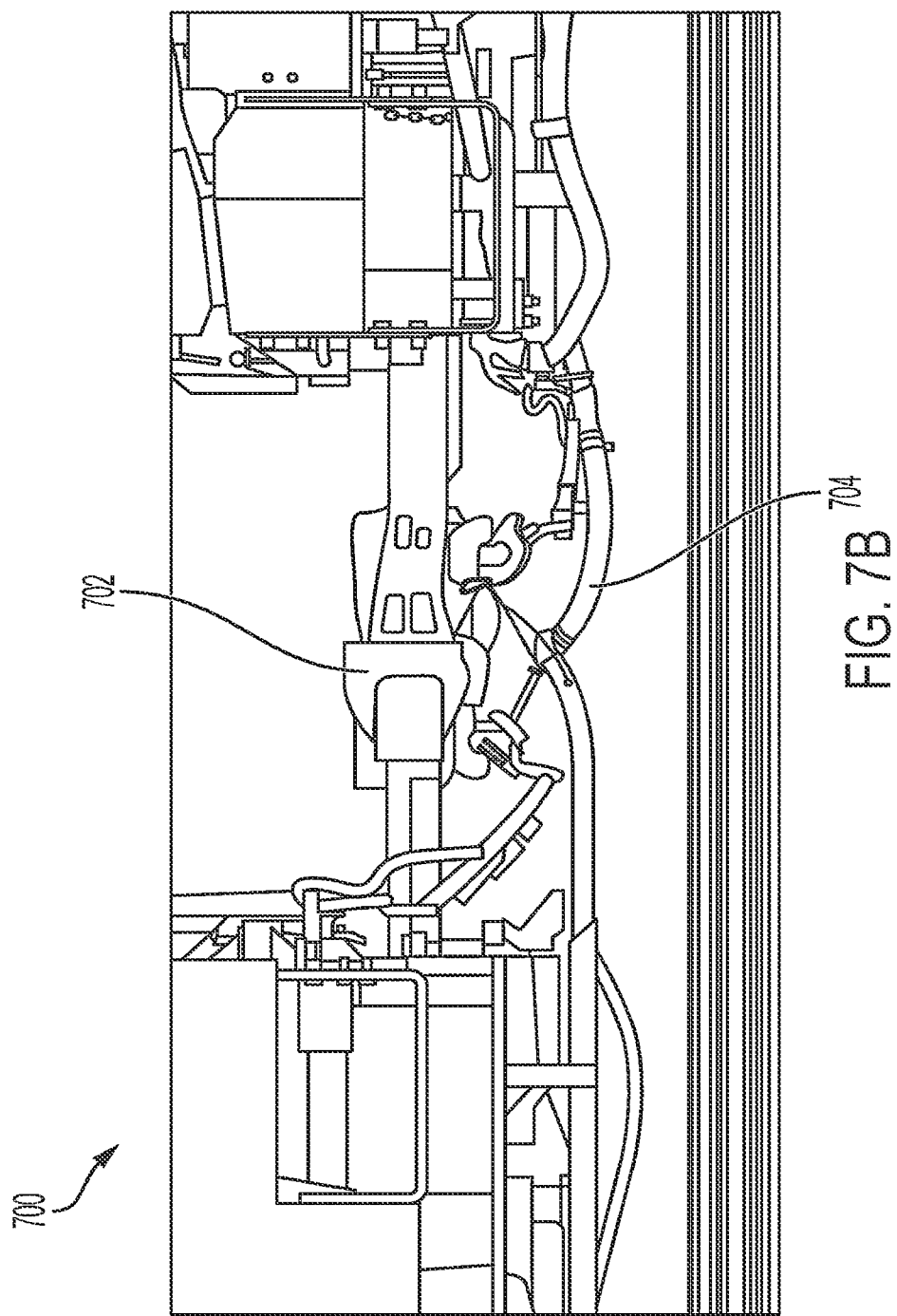
Figure 8:
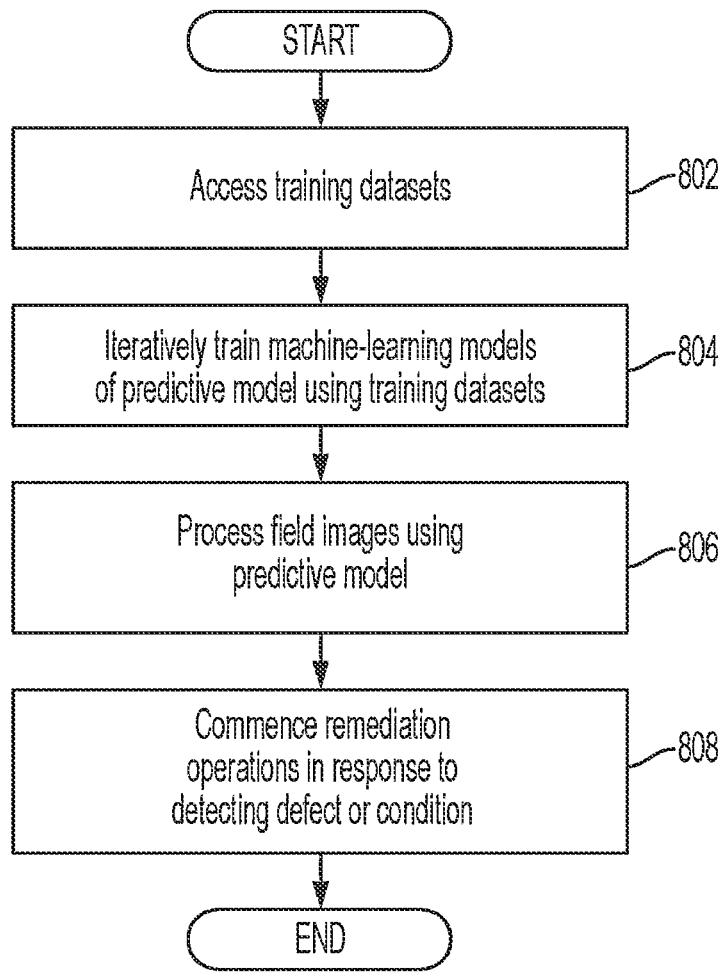
FIG. 8 is a flow chart depicting an example process for training the predictive model of FIG. 1 and analyzing raw images using the trained predictive model, according to one aspect of the present disclosure.

Turning now to FIGS. 6-8, examples of raw images of railcar components that are available for analysis by the predictive model 100 are depicted. The raw images of FIGS. 6-8 are described for exemplary and illustrative purposes only. Hundreds of additional components of the railcars may similarly be analyzed by the predictive model 100 to identify defects or conditions associated with the railcars. FIG. 6 is an exemplary F-type coupler 600, according to one aspect of the present disclosure. The F-type coupler 600 is a commonly used coupler in for railcars in North America. F-type couplers 600 are attached to the railcar using plates 602, which may be secured in place using nuts and bolts 604. As trains move at high speeds, vibrations and movement between components can cause the nuts and/or bolts 604 to disengage from the plates 602. Without the nuts and bolts 604, additional vibrations and movement can cause disengagement of the plates 602, which may lead to failure of the coupler securement. In some examples, the prediction model 100 may be trained, using the curated training datasets, to identify, from a raw image 112, missing nuts and bolts 604, missing plates 602, or a combination thereof.

Figure 6B:
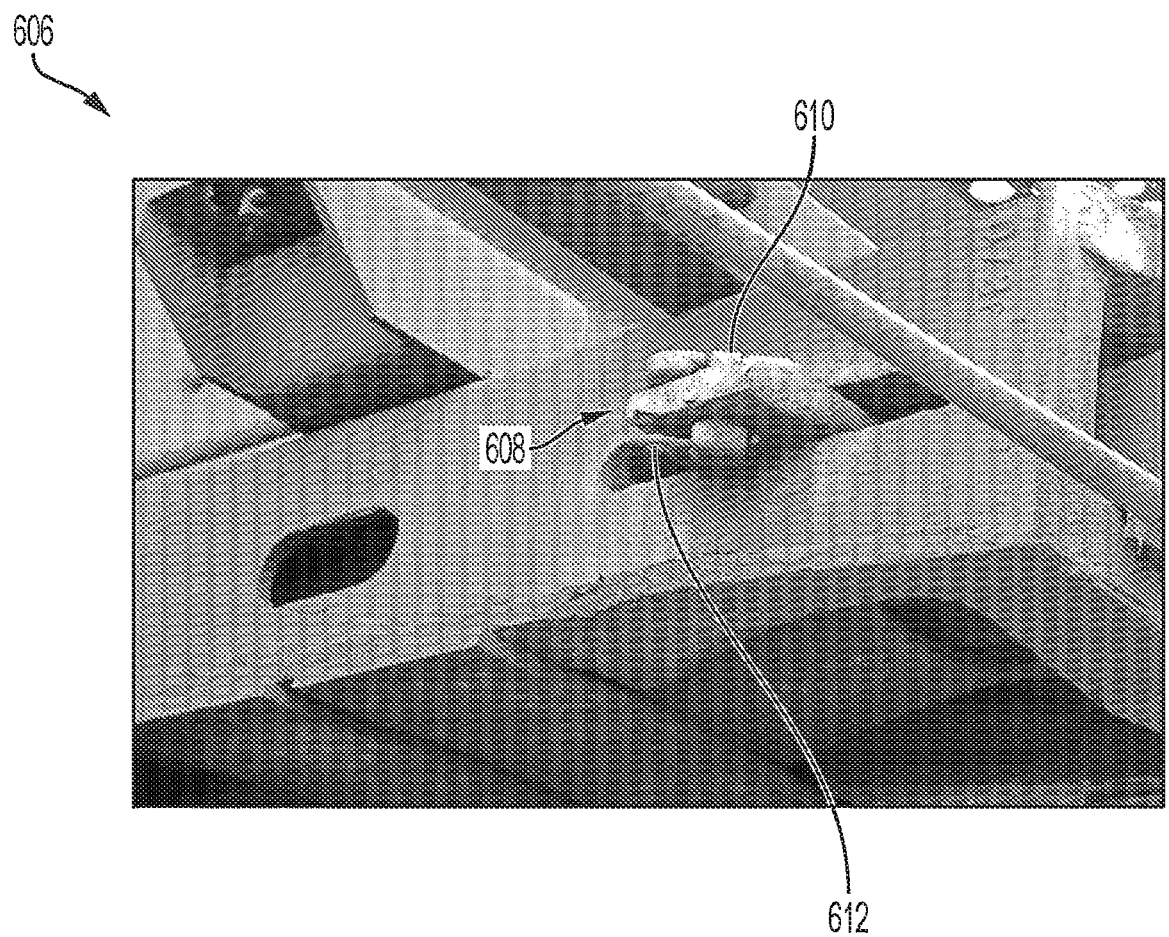

FIG. 6B is an exemplary E-type coupler 606, according to one embodiment of the present disclosure. The E-type coupler 606 may be used to couple together railcars of a train. The E-Type couplers 606 may be attached to the rail car using a draft key or cross-key 608. The cross-key 608 may be secured by a retainer pin 610, which may be secured in place using a cotter key 612. As trains move at high speeds, vibrations and movement between components can cause the cotter key 612 decouple from the E-type coupler 606. Without the cotter key 612, additional vibrations and movement can cause disengagement of the retainer pin 610 and, eventually, the cross-key 608, leading to potential failure of the coupler securement. In some examples, the prediction model 100 may be trained, using the curated training datasets, to identify the missing cotter key 612 and/or disengagement of the retainer pin 610 in a raw image 112 obtained in the field.

Turning now to FIG. 7 (including FIG. 7A and FIG. 7B), an exemplary rail car connection 700 is shown, according to one aspect of the present disclosure. In an example, two railcars may be connected by various components. In the example shown in FIG. 7, two railcars are connected by a coupler securement system 702 and an air hose connection (e.g., a gladhand) 704. In these examples (and others), the coupler securement system 702 facilitates the connection of rolling stock (i.e., all types of wheeled railcars, powered and unpowered) in a train. In particular examples, the gladhand 704 is used to facilitate operation of an air brake system of the train. In certain embodiments, and as shown in FIG. 7A, when the gladhand 704 forms a U-shape (i.e., a convex angle), the gladhand 704 is in normal operating condition such that air pressure is maintained at a desirable level and the air brake remains open. In some examples, and as shown in FIG. 7B, when the gladhand 704 forms a concave angle (i.e., "peaks"), the air hose is in an improper condition such that air pressure decreases and the train may come to an emergency stop, which can cause severe delays. In some examples, the prediction model 100 may be trained, using the curated training datasets, to identify the shape of the gladhand 704 or other portions of the air hose in a raw image 112 obtained in the field. While FIGS. 6 and 7 include raw images of railcar components that algorithms of the predictive model 100 can be trained to analyze, the algorithms of the predictive model 100 can also be trained to identify additional railcar components that may be depicted in the raw images 112.

FIG. 8 is a flow chart depicting an example process for training the predictive model 100 and analyzing raw images 112 using the trained predictive model 100, according to one aspect of the present disclosure. One or more of the blocks shown and described may be performed simultaneously, in a series, in an order other than shown and described, or in conjunction with additional blocks. Some blocks may be omitted or, in some applications, repeated. At block 802, the process 800 involves accessing the training datasets 504, as generated in the process 500 of FIG. 5. In some example, the training datasets 504 may be received or otherwise accessed from the training dataset repository 260.

At block 804, the process 800 involves iteratively training the machine-learning models of the predictive model 100 using the training datasets 504. In some examples, the iterative training of the machine-learning models may be performed as described in the processes 900 and 1000 below with respect to FIGS. 9 and 10. In an example, each of the machine-learning models of the predictive model 100 may be trained using a different training dataset 504. In additional examples, the machine-learning models of the predictive model 100 may be trained using the same training datasets 504.

At block 806, the process 800 involves processing field images using the trained predictive model 100. In some examples, the field images may be processed by the trained predictive model 100 as described below in the processes 1100, 1200, 1300, and 1400 below with respect to FIGS. 11-14. In an example, the predictive model 100 may use one or more machine-learning algorithms to identify a particular defective component of a railcar that is visible in the field images.

At block 808, the process 800 involves commencing remediation operations in response to detecting a defect or condition of a component of the railcar. In some examples, the commencement of the remediation operations may be performed as described in the process 1600 below with respect to FIG. 16. The remediation operations may include automatically routing the train or the individual railcar to a repair facility. Additionally, the remediation operations may involve automatically alerting a mechanical crew of the defect or condition detected at the railcar. Other remediation operations may also be initiated in response to detecting the defect or condition of the railcar. For example, the remediation operations may include logging a defect or condition for future consideration or analysis, ordering a replacement part for a defective component through an online ordering system, sending a signal to field camera system 20 at subsequent locations along the railway to focus on a particular defect or condition for confirmation of the defect, alerting emergency personnel and providing a location of the train (e.g., if the defect or condition is urgent or serious), or any other remediation operations that may be deployed to address the identified defect or condition.

Figure 9:
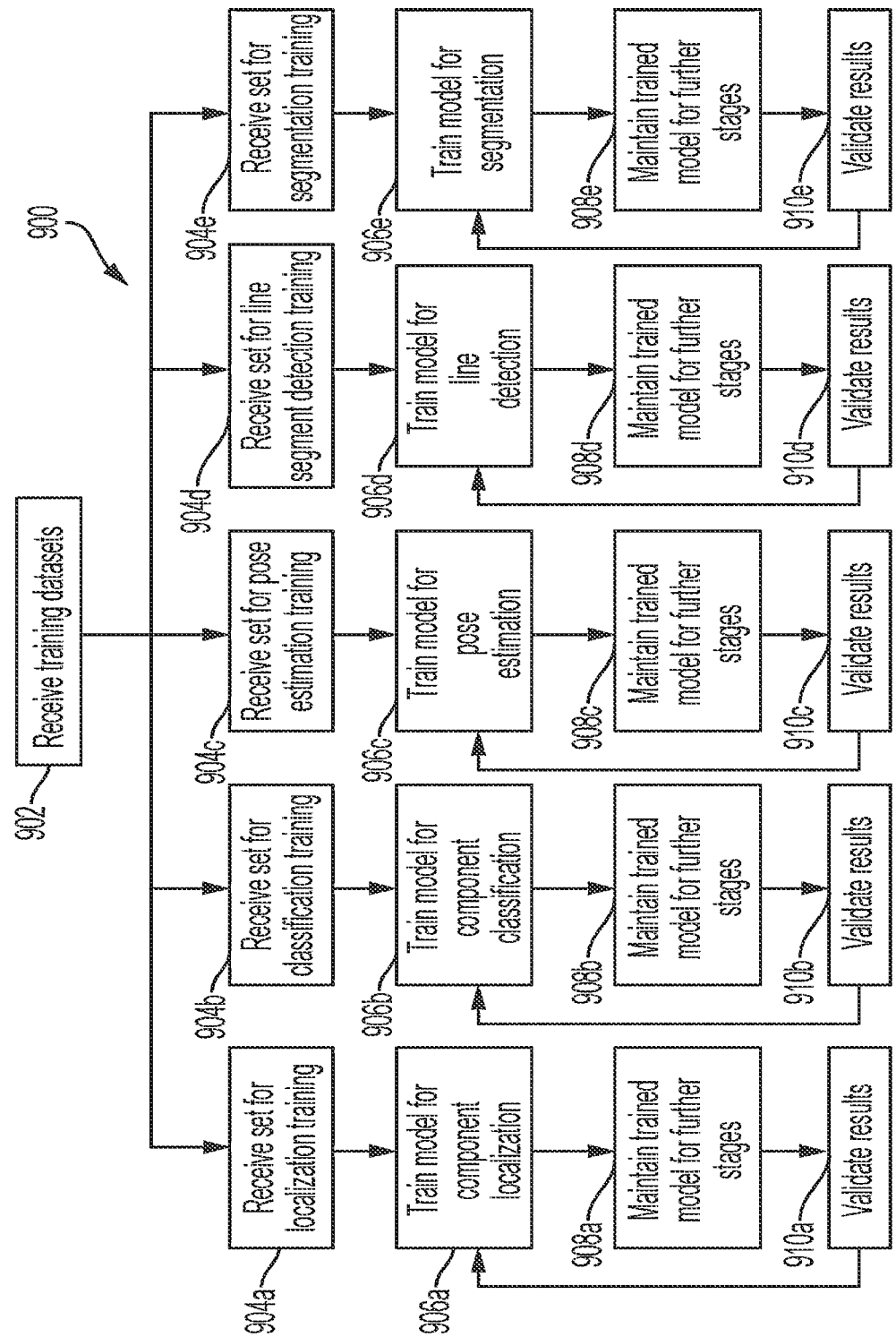
FIG. 9 is a flow chart depicting an example process of training one or more machine-learning models, according to one aspect of the present disclosure.

FIG. 9 is a flow chart depicting a process 900 of training a set of machine-learning models, according to one embodiment of the present disclosure. In an example, the machine-learning models may be the models associated with the localization engine 102, the classification engine 104, the pose estimation engine 106, the line segment detection engine 108, and the segmentation engine 110 of the predictive model 100. One or more of the blocks shown and described may be performed simultaneously, in a series, in an order other than shown and described, or in conjunction with additional blocks. Some blocks may be omitted or, in some applications, repeated.

At block 902, the process 900 involves receiving the training datasets 504, such as the training datasets 504 described above with respect to FIG. 5. In an example, the training datasets 504 may include training sets of images, validation sets of images, and testing sets of images. Additionally, the training datasets 504 may include raw images 112, synthetic images 502, and augmented raw images and synthetic images.

At blocks 904a-904e, the training datasets 504 are received for the particular machine-learning models. In some examples, a training dataset 504 may be curated specifically for a particular machine-learning model, such as the localization model of block 904a. In other examples, a training dataset 504 may be used in the training of each of the machine-learning models of the predictive model 100. While training datasets 504 are described as being received for the five machine-learning models of blocks 904a-904e, other machine-learning models that are suitable for detecting defects or conditions or issues with the railcars of a train may also be trained using a similar process. In an example, the machine-learning models of blocks 904a-904e may be convolutional neural networks (CNNs).

The dataset curating application 216, in some examples, may manage the process of curating the training datasets 504 for each of the machine-learning models. In some examples, the training datasets 504 used to train each of the machine-learning models are separate and distinct from one another, so that the machine-learning models, when used together, may be more robust when compared to training with a single training dataset 504.

At blocks 906a-906e, the process 900 involves training the machine-learning models. In an example, the localization machine-learning model of block 906a may be trained for component localization. In other words, the localization machine-learning model may be trained to identify various regions of interest in raw images 112 that are relevant to the operation of the railcar. For example, the localization machine-learning model may be trained to identify regions of interest in the raw images 112 that include coupler components, air hoses, braking systems, axles, springs, wheels, or any other components of the railcar or train passing the field camera system 20.

The classification machine-learning model of block 906b may be trained for component classification. In other words, the classification machine-learning model may be trained to identify the presence of a particular component in the raw images 112. For example, the classification machine-learning model may be trained to identify whether a specific component is included in the raw images 112, such as coupler components, air hoses, braking systems, axles, springs, wheels, or any other components of the railcar or train passing the field camera system 20.

The pose estimation model of block 906c may be trained to identify poses of components in the raw images 112. In other words, the pose estimation model may be trained to identify whether an arrangement of a component is incorrect. For example, the pose estimation model may identify whether the pose of certain components of a railcar is adequate. The components may include air hoses, wheel shapes, spring shapes, axle shapes, or any other components of the railcar or train obtained by the field camera system 20.

The line segment detection model of block 906d may be trained to detect when line segments of the raw images 112 that correspond to railcar components are displaced. Further, the segmentation model of block 906e may be used to identify specific components in the raw images 112 that may be relevant to the operation of the railcar. For example, the line segment detection model and the segmentation model may be trained to detect displaced or missing components in the raw images 112 such as coupler components, air hoses, braking systems, axles, springs, or any other components of the railcar or train passing the field camera system 20.

At blocks 908a-908e, the process 900 involves maintaining the trained models for further stages. The trained models may be maintained in the algorithm repository 270 of the databases 300. The further stages may include a validation stage, such as at blocks 910a-910e discussed below, or the further stages may include field implementation of the trained models.

At blocks 910a-910e, the process 900 involves validating the results of training operations. In an example, the trained models may be applied to a validation set of the training datasets 504 between training stages to evaluate the progress of each model. In some examples, a staged training application 218 of the training system 210 may regulate and modulate the presentation of the datasets within each curated training dataset 504, respectively, to facilitate the training in an efficient and controlled manner. Depending on the results of the validation operation at block 910a-910e, the process 900 may return to blocks 906a-906e for further training of the models.

Figure 10:
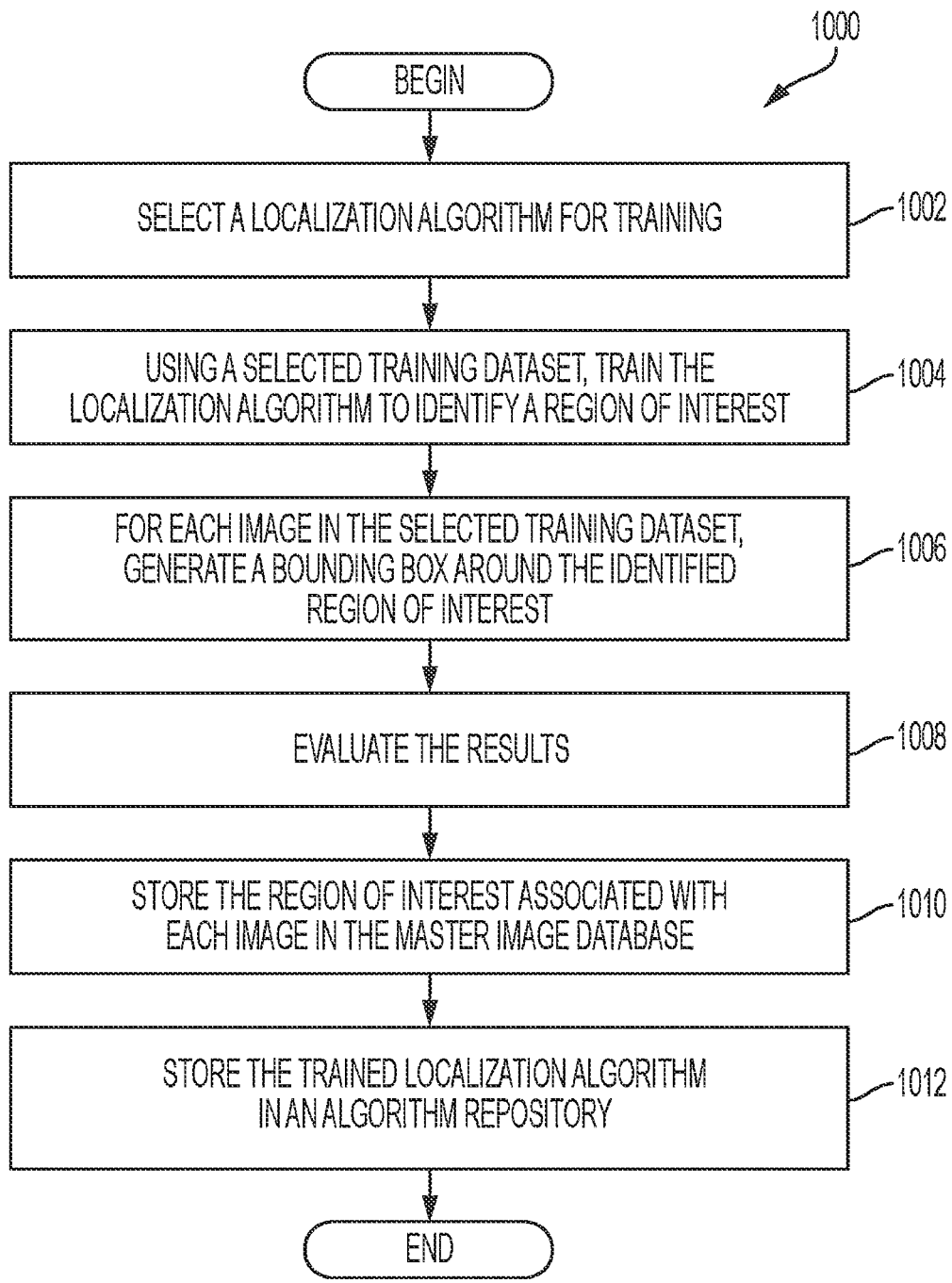
FIG. 10 is a flow chart depicting an example process of training a machine-learning localization algorithm, according to one aspect of the present disclosure.

FIG. 10 is a flow chart of a process 1000 for training a machine-learning localization algorithm of the predictive model 100 described herein. One or more of the blocks shown and described may be performed simultaneously, in a series, in an order other than shown and described, or in conjunction with additional blocks. Some blocks may be omitted or, in some applications, repeated. Additionally, while the process 1000 is described with respect to a machine-learning localization algorithm, other algorithms may be trained in a similar manner using the techniques described in the process 1000. For example, similar training techniques for a classification machine-learning algorithms, pose estimation machine-learning algorithms, line segment detection machine-learning algorithms, and segmentation machine-learning algorithms may be trained using similar techniques.

At block 1002, the process 1000 involves receiving a localization algorithm to be trained. Localization may refer to the process of using an algorithm to identify regions of interest in digital images, such as the raw images 112. The regions of interest may be portions of the images where a particular railcar component is located. By identifying regions of interest in the raw images 112, other algorithms may be able to further process a portion of the raw images 112 that is likely to include the particular railcar component, and the results of the further processing may have enhanced accuracy. The localization algorithm may be selected from any of a variety of image segmentation algorithms, some of which analyze digital images pixel by pixel to locate a region of interest. Localization algorithms may be used in a variety of computer vision applications, such as medical diagnostic imaging, autonomous vehicle navigation, and augmented reality systems. The localization algorithm, in an example, may be a convolutional neural network.

At block 1004, the process 1000 involves using a selected training dataset 504, which has been curated as described herein, to train the selected localization algorithm. The selected training dataset 504 may include a training set, a validation set, and a testing set. Using the selected training dataset 504, the selected localization algorithm is trained to identify regions of interest in each image. In various embodiments, the localization algorithm may include a fixed-size, rectangular selection tool that moves in small, incremental steps (e.g., up, down, left, right) to scan an image to facilitate identification of the regions of interest. In some embodiments, the selection tool may be adjustable (e.g., not fixed-size). In additional embodiments, the selection tool may be any suitable shape to facilitate identifying regions of interest.

At block 1006, the process 1000 involves generating a bounding box around the region of interest using the selected localization algorithm during training process. In the context of a digital image, the bounding box may be a polygon defined by a number of edges and vertices. The bounding box may be further defined by one or more sets of coordinates, relative to an established image coordinate system.

In an exemplary and non-limiting embodiment, a first region of interest enclosed by the bounding box may be associated with a coupler securement mechanism (e.g., plates and related components), as shown above with respect to the example raw images in FIGS. 6 and 8. In certain examples, a second region of interest may be located within the first region of interest. In such an example, the second region of interest may be associated with one or more particular bolts, nuts, securement pins, cotter keys, etc. of the coupler securement mechanism, and the second region of interest may provide a mechanism to quantify the number of bolts, nuts, securement pins, cotter keys, or other components identified. Nested regions of interest may also be relevant to other railcar components with individual parts that can be analyzed by the predictive model 100.

At block 1008, the results produced by the selected localization algorithm may be evaluated, in some examples, using a validation set of images of the training dataset 504. The validation set may include raw images 112, synthetic images 502, and/or secondary images together with a condition or value that describes where the regions of interest are located in the image. In this aspect, the one or more conditions identifiable by the localization algorithm may include a value or set of values defining the regions of interest. The operation of evaluating the results may include determining whether the regions of interest in the results match the stored regions of interest for the image. The accuracy of the match may be expressed in terms of degree, such as a percentage overlap, such that the results indicate the relative progress (or regress) of the selected localization algorithm being trained. The operation of evaluating the results may be executed and controlled by the evaluation and scoring module 224.

At block 1010, upon determining that the evaluated results meet or exceed a predetermined threshold, the process 1000 involves storing the regions of interest associated with each image, as determined by the newly trained localization algorithm, in the master image database 200 in a record associated with the original raw image 112 and/or the secondary image 150. In this aspect, the regions of interest associated with each image are stored and available for retrieval and use by subsequent algorithms, as described herein.

At block 1012, the process 1000 involves storing the newly trained localization algorithm in the algorithm repository 270. Consistent with aspects of the present disclosure, training of the selected localization algorithms may be conducted separate and apart from the training of other machine-learning algorithms.

Figure 11:
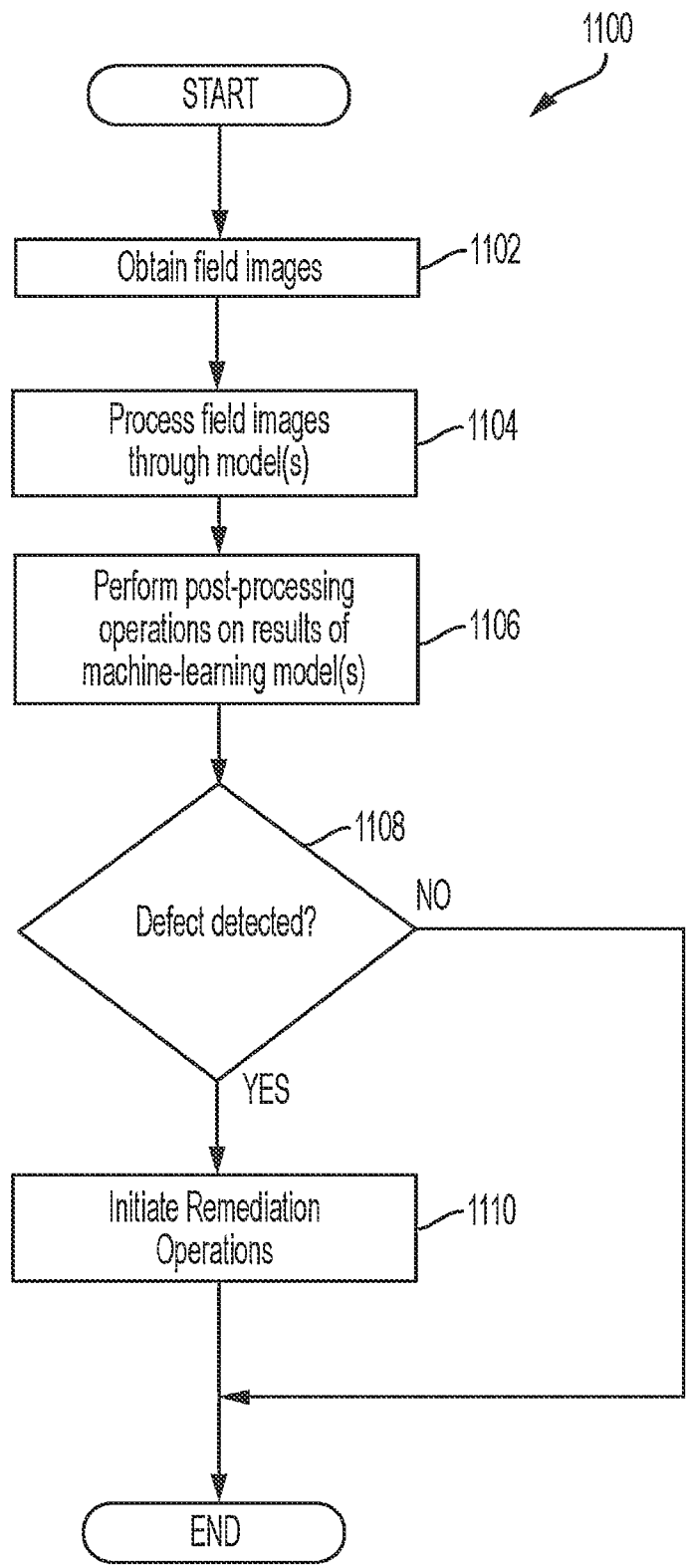
FIG. 11 is a flow chart depicting a process of identifying a defect or condition of a railcar using one or more trained machine-learning models, according to one aspect of the present disclosure.

FIG. 11 is a flow chart depicting a process 1100 for identifying a defect or condition of a railcar using one or more trained machine-learning models, according to one aspect of the present disclosure. One or more of the blocks shown and described may be performed simultaneously, in a series, in an order other than shown and described, or in conjunction with additional blocks. Some blocks may be omitted or, in some applications, repeated. At block 1102, the process 1100 involves obtaining field images, such as the raw images 112. The field images may be collected by one or more field camera systems 20 of the waysides 10 and provided to the predictive model 100 for processing.

In some examples, predictive models 100 are processed on edge servers located near the field camera systems 20. For example, one or more components of the predictive models 100 are stored locally, on an edge server, where images captured by the field camera system 20 are processed and scored, as described herein. The edge-computing arrangement may avoid communication challenges associated with a poor connection to a distant server located remote from the field camera system 20. In additional examples, the predictive models 100 may be located at a server remote from the wayside 10, and field camera system 20 may transmit the field images to the remote server across a network.

At block 1104, the process 1000 involves processing field images through one or more machine-learning models. The machine-learning models may be trained using the processes described above with respect to FIGS. 9 and 10 to detect missing, broken, cracked, and/or displaced components of a railcar of a train. In some examples, the machine-learning models may be used as single stage networks to detect the defects or conditions of the railcars. For example, to detect displaced components, the predictive model 100 may apply a segmentation model of the segmentation engine 110, a line segment detection model of the line segment detection engine 108, and/or a pose estimation model of the pose estimation engine 106 to the field images to identify the displaced components.

In an additional example, the machine-learning models may be used as multi-stage networks to detect the defects or conditions of the railcars. For example, to detect missing or broken components, the predictive model 100 may apply a localization model of the localization engine 102 to identify a region of interest of the field image. Upon identifying the region of interest, the predictive model 100 may apply a classification model of the classification engine 104 to make a determination regarding the presence or state of the railcar components.

At block 1106, the process 1100 involves performing post-processing operations on the results of the machine-learning models. In some examples, the post-processing operations remove data that is not relevant to detection of a defect or condition of the railcar. For the localization model of the localization engine 102, the predictive model 100 may filter the field image based on the component of the railcar. For example, if the component is expected to be in certain regions of the field images or of certain sizes, then the predictive model 100 can remove other portions of the field images. Similarly, for the segmentation model of the segmentation engine 110, the predictive model 100 can remove segments of the field images that are known to be smaller than components of interest of the railcar. Additionally, for the pose estimation model of the pose estimation engine 106, if the detected pose of the railcar component does not make geometric sense (e.g., the pose does not track one of a set of expected geometries for the component), then the pose prediction can be ignored. For the line segment detection model of the line segment detection engine 108, any lines that are too small or that do not meet other criteria, such as line angle or location in an image, can be filtered out of the results.

At block 1108, the process 1100 involves determining if the machine-learning models indicate that a defect or condition is detected in the field images. A defect can be a missing, displaced, or broken component of the railcar. In an example, the defect may be a missing coupler, a displaced air hose, a crack in an axle, or any other defects that are visually observable in the field images. In some examples, the defect may be an indicator that some type of failure is imminent. For example, the machine-learning modules may be trained to detect wear on certain components of the railcar. If the detected wear exceeds a threshold, then the wear may be categorized as a defect due to a heightened potential for an imminent failure event. Conditions may include any indicators detected from the field images that may indicate that maintenance of the railcar may be needed but failure of a railcar system is not imminent. In some examples, the conditions may be indicators that a certain component is not in a correct location pose, but the component is still capable of performing a desired operation. Examples of the condition may include issues with the body or undercarriage of the railcar, rust on components, visible evidence of component overheating, or any other conditions of the railcar that are visible in the field images. The condition indicator may be used to trigger routine maintenance for various components. If a defect or condition is detected, then, at block 1110, the process 1100 involves initiating remediation operations. In some examples, the remediation operations include automatically routing the train or the individual railcar to a repair facility. Additionally, the remediation operations may involve automatically alerting a mechanical crew of the defect or condition detected at the railcar. Other remediation operations may also be initiated in response to detecting the defect or condition of the railcar. For example, the remediation operations may include logging a defect or condition for future consideration or analysis, ordering a replacement part for a defective component through an online ordering system, sending a signal to field camera system 20 at subsequent locations along the railway to focus on a particular defect or condition for confirmation of the defect, alerting emergency personnel and providing a location of the train (e.g., if the defect or condition is urgent or serious), or any other remediation operations that may be deployed to address the identified defect or condition.

In some examples, each of the field images analyzed by the predictive model 100 may be tagged with metadata. The metadata may include a time, location, railcar identification, portion of the railcar included in the image (e.g., end, side, undercarriage, etc.), any additional information associated with the defect, or any combination thereof. In such an example, the image with the metadata tag may be included with any notification provided to a remediation team or process. If a defect or condition is not detected at block 1108, then the process 1100 may end.

Figure 12:
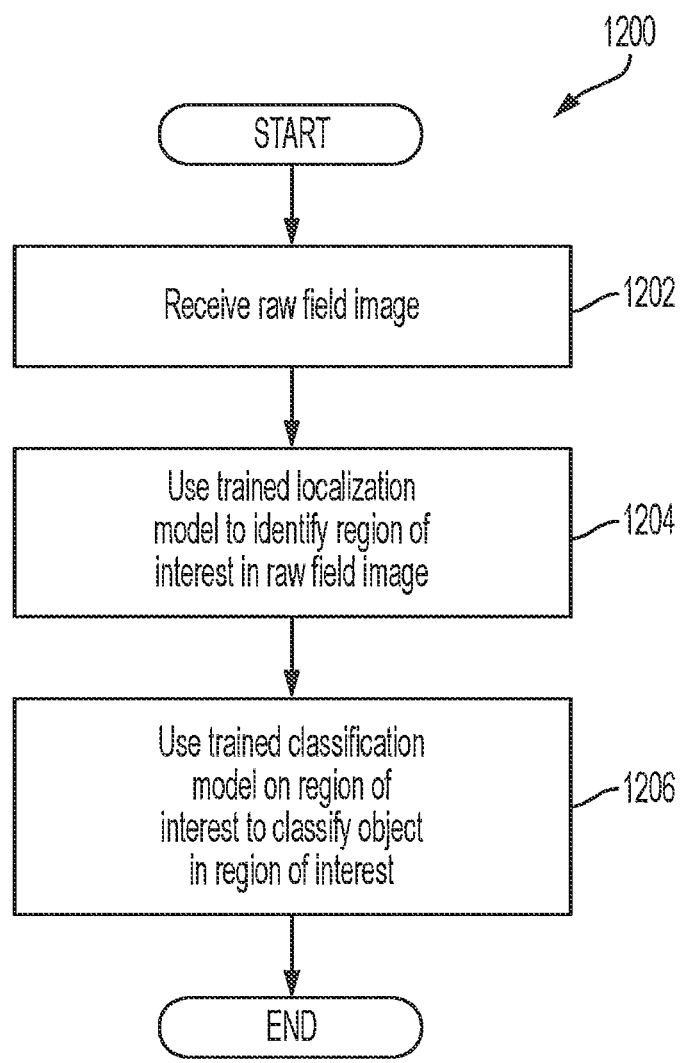
FIG. 12 is a flow chart depicting a process of classifying missing or broken components in a field image, according to one aspect of the present disclosure.

FIG. 12 is a flow chart depicting a process 1200 of classifying missing or broken components in a field image, according to one aspect of the present disclosure. One or more of the blocks shown and described may be performed simultaneously, in a series, in an order other than shown and described, or in conjunction with additional blocks. Some blocks may be omitted or, in some applications, repeated. In some examples, the image processing application 312 of the notification system 310 may perform the operations of the process 1200. When classifying missing or broken components in the field image multiple machine-learning algorithms may be employed to enhance the accuracy of analysis results. Thus, the process 1200 involves a multi-stage network of machine-learning models to identify the missing or broken components in the field image. At block 1202, the process 1200 involves receiving a raw field image of a railcar from the field camera system 20. Raw field images may be taken of every railcar, railcar connection point, or both of a train passing the wayside 10 that includes the field camera system 20.

At block 1204, the process 1200 involves the trained localization model of the localization engine 102 to identify a region of interest in the raw field image. The region of interest may include a region of the raw image that shows a particular component of a railcar. In an example, the region of interest may include couplers between railcars, air hoses between railcars, braking systems, axles, springs, or any other components of the railcar visible in the raw field image. In additional examples, the trained localization model may be trained to identify other or multiple regions of interest of the railcar depicted in the raw field image.

At block 1206, the process 1200 involves using the trained classification model of the classification engine 104 on the region of interest identified at block 1206 to classify an object in the region of interest. In some examples, the classification model may be trained to identify one or more components that are expected to be present on the railcar. For example, the classification model may be trained to identify expected components of a coupler between railcars such as nuts, bolts, retainer pins, cotter keys, and the like. If one or more of the expected components of the coupler are missing, the classification model may output an indication that components of the coupler are missing. In additional examples, other components of the railcar may also be identified by the classification model as being missing.

Figure 13:
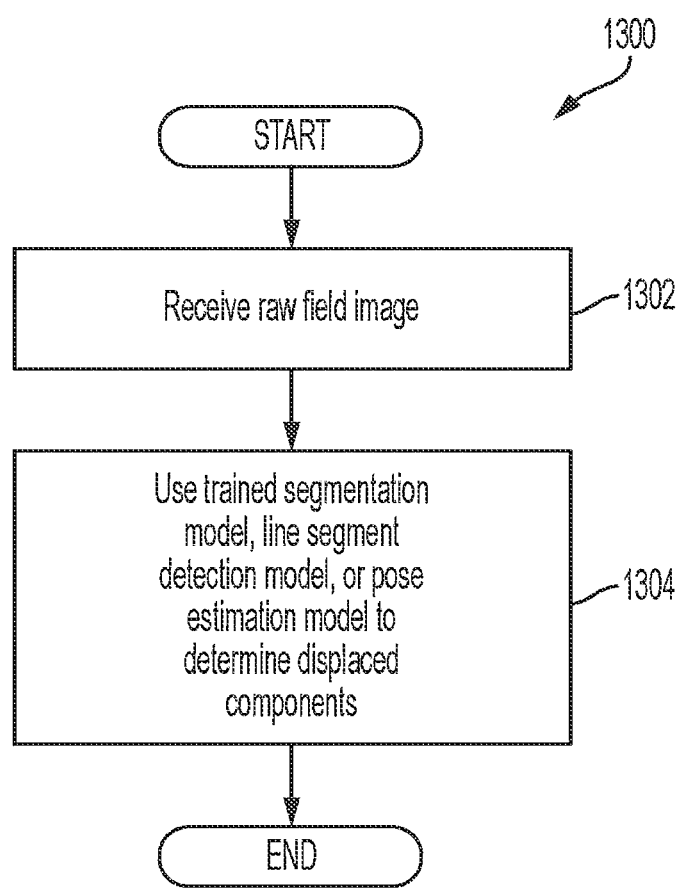
FIG. 13 is a flow chart depicting a process of determining displaced components in a field image, according to one aspect of the present disclosure.

FIG. 13 is a flow chart depicting a process 1300 for determining displaced components in a field image, according to one aspect of the present disclosure. One or more of the blocks shown and described may be performed simultaneously, in a series, in an order other than shown and described, or in conjunction with additional blocks. Some blocks may be omitted or, in some applications, repeated. When determining displaced components in the field image an individual machine-learning algorithm may be employed to perform the analysis to simplify computational complexity of the analysis. The process 1300 involves using a single-stage, machine-learning model to identify a defect or condition in the field image. In some examples, the image processing application 312 of the notification system 310 may perform the operations of the process 1300. At block 1302, the process 1300 involves receiving a raw field image of a railcar from the field camera system 20. As with the process 1200 described above, the raw field images may be taken of every railcar, railcar connection point, or both of a train passing the wayside 10 that includes the field camera system 20.

At block 1304, the process 1300 involves using a trained segmentation model of the segmentation engine 110, a trained line segment detection model of the line segment detection engine 108, and/or a trained pose estimation model of the pose estimation engine 106 on the raw field images to determine displaced component of the railcar. In some examples, the models may be trained to detect that an expected component is not present or not in a correct orientation. For example, the line segment detection model and the pose estimation model may each detect geometric abnormalities that skew from an expected geometric arrangement of components in the raw field image. Additionally, the segmentation model may visually segment the raw field image to segment components of the raw field image. For example, the segmentation model may detect that an expected component is missing or in an unexpected position.

In an example, the segmentation model, the line segment detection model, and the pose estimation model may each be used to analyze the raw field image for the same displaced component. For example, the three models may each be trained, using the same or different training datasets 504, to analyze the same component of the raw field images. In additional examples, the three models may each analyze the raw field image for different displaced components. For example, the pose estimation model may be trained to analyze potential displacement of an air hose between railcars, while the segmentation model and the line segment detection model may be trained to analyze various components of the railcar connector systems (e.g., E-type connectors, F-type connectors, etc.).

An output of the machine-learning models, such as those employed in the processes 1200 or 1300 discussed above with respect to FIGS. 12 and 13 may be processed to generate a field score of the raw field image. The field score may be an indication of whether a particular component or information about a particular component was detected by the machine-learning models. Using the field score, a defect or other condition of a railcar may be determined.

Figure 14:
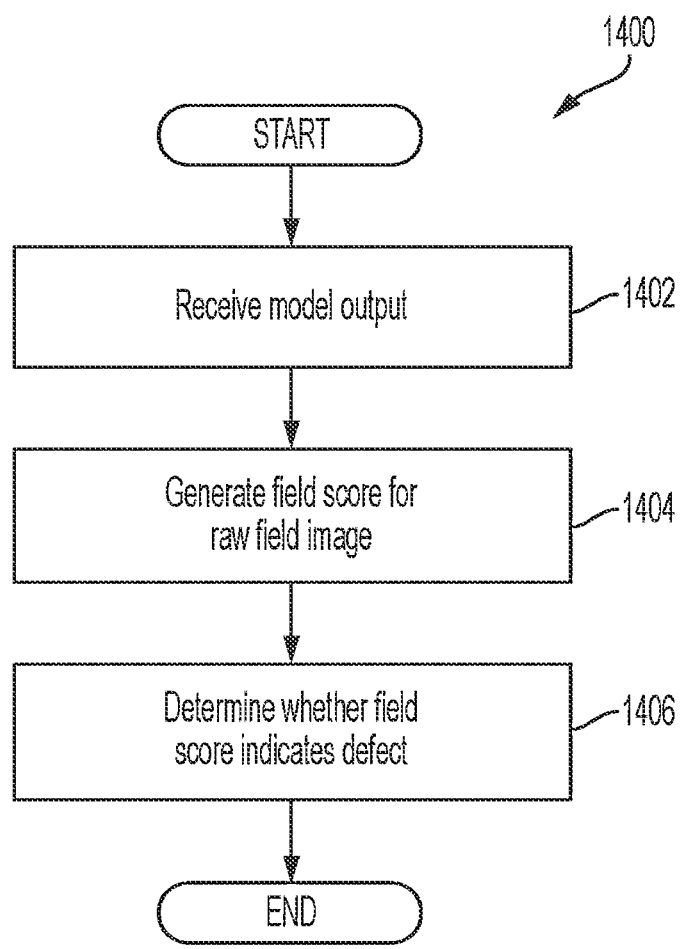
FIG. 14 is a flow chart depicting a process of determining whether field scores generated from an output of the one or more trained machine-learning models indicate a defect or condition at the railcar, according to one aspect of the present disclosure.

For example, FIG. 14 is a flow chart depicting a process 1400 for determining whether field scores generated from outputs of the one or more trained machine-learning models indicate a defect or other condition at the railcar, according to one aspect of the present disclosure. One or more of the blocks shown and described may be performed simultaneously, in a series, in an order other than shown and described, or in conjunction with additional blocks. Some blocks may be omitted or, in some applications, repeated. At block 1402, the process 1400 involves receiving a model output from one or more models analyzing a raw field image. The model output may include information associated with the raw field image based on what an individual model was trained to detect. For example, the model output may provide information associated with the presence or absence of an expected component in the raw field image.

At block 1404, the process 1400 involves the scoring module 314 of the notification system 310 generating a field score for a component of the raw field images based on the outputs of the models. In some examples, the field score may be an indication that an expected component is missing or out of place. The raw field images may be analyzed by multiple models, such as the classification model, the pose estimation model, the line segment detection model, the segmentation model, or any other models to detect certain types of components in raw field images.

At block 1406, the process 1400 involves the scoring module 314 determining whether the one or more field scores indicate a defect or other condition of the railcar. A defect, as used herein, includes any negative condition associated with any component of a railcar. In an example with an individual model generating an individual field score, the field score itself may provide the indication that a defect or condition is present. In an event that multiple models have been used to provide a more robust anomaly detection operation, the multiple models may generate multiple field scores for the raw field image, and the scoring module 314 may also generate a composite field score that indicates whether the defect or condition is present. The composite field score may be generated by determining the results of a simple majority of the field scores of the multiple models, as described below with respect to FIG. 15. The scoring module 314, in some implementations, stores the composite field score and the individual field scores in the master image database 200 in the record associated with the raw field image.

Figure 15:
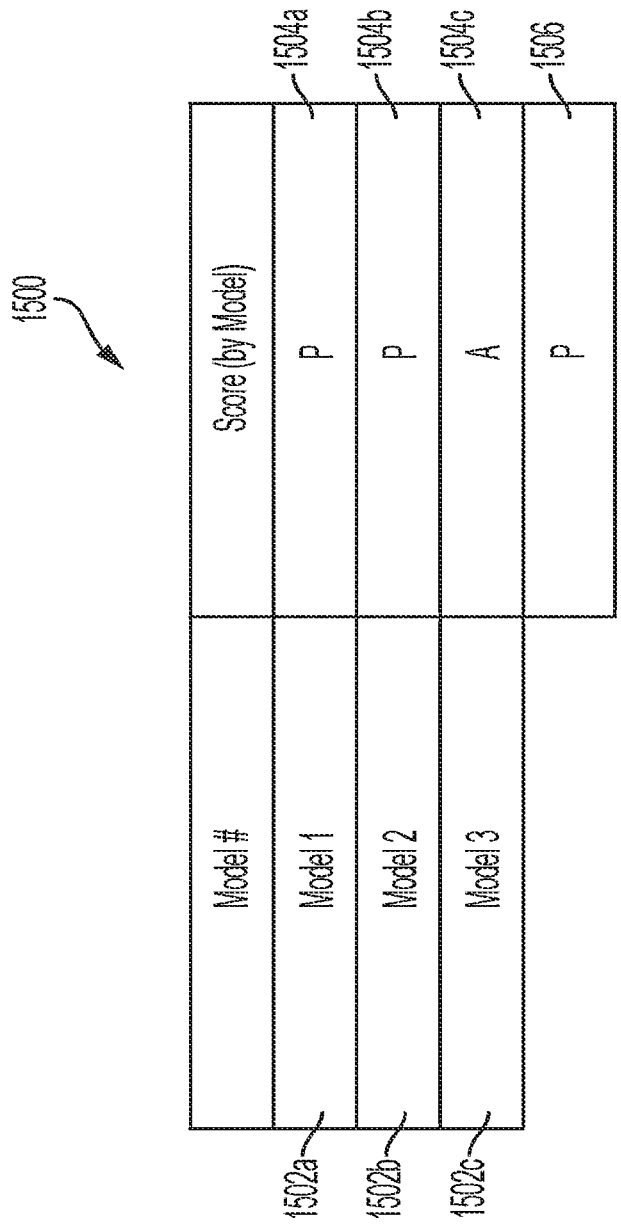
FIG. 15 is a diagrammatic representation of an example of a table of field scores of a field image, according to one aspect of the present disclosure.

FIG. 15 is a diagrammatic representation of a table 1500 of field scores generated from the raw field image, according to one aspect of the present disclosure. As discussed above, some predictive models 100 may include multiple models 1502a, 1502b, and 1502c that analyze a field image for the same railcar component. For example, each of the models 1502a, 1502b, and 1502c may be trained to detect a missing bolt in a coupler securement of the railcar. In some examples, the models 1502a, 1502b, and 1502c may be a different type of model. In additional examples, the models 1502a, 1502b, and 1502c may be the same type of model (e.g., a segmentation model), but the models 1502a, 1502b, and 1502c may be trained using different training datasets 504. Further, while the models 1502a, 1502b, and 1502c are described as being trained to detect a missing bolt in a coupler securement of a railcar, in additional examples, the models 1502a, 1502b, 1502c may be trained to detect any other components of the railcars that are visible in the raw filed image.

The scores 1504a, 1504b, and 1504c of the raw field image for each of the individual models 1502a, 1502b, and 1502c may be expressed in binary terms, such as bolts present (P) or bolts absent (A). In such an example, the score for each model may be tallied according to a simple majority to determine a composite field score 1506. In some examples, the composite field score 1506 may be used as a final indicator of whether an anomaly or defect is present. Additionally, while FIG. 15 is described with respect to the presence or absence of an expected component is observed in the raw field image, similar field scores may be determined with detecting broken, cracked, or displaced components using multiple machine-learning models.

Figure 16:
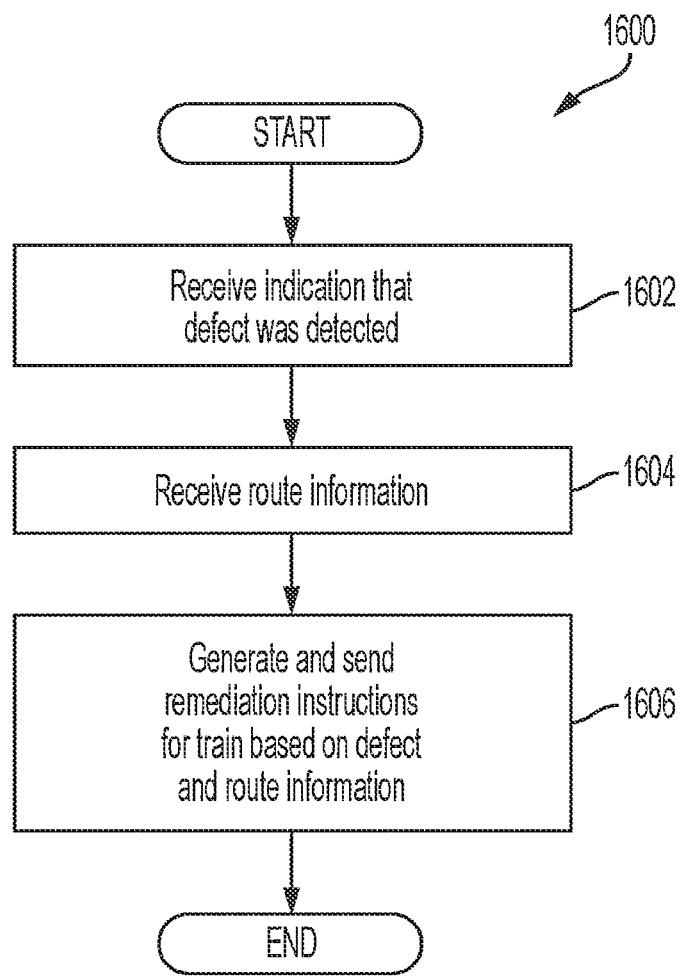
FIG. 16 is a flow chart depicting a process of generating remediation instructions upon detecting the defect or condition at the railcar, according to one aspect of the present disclosure.

FIG. 16 is a flow chart depicting a process 1600 of generating remediation instructions upon detecting the defect or condition at the railcar, according to one aspect of the present disclosure. One or more of the blocks shown and described may be performed simultaneously, in series, in an order other than shown and described, or in conjunction with additional blocks. Some blocks may be omitted or, in some applications, repeated. At block 1602, the process 1600 involves receiving an indication that a defect or condition was detected. The indication may be a field score or a composite field score generated from outputs of the machine-learning models of the predictive model 100 that indicates that a component of the railcar is missing, broken, or displaced.

At block 1604, the process 1600 involves the notice module 316 receiving route information of the railcar. In an example, the route information may provide an indication of the most convenient location for remediation operations on the railcar to occur. In some examples, the notice module 316 can provide mechanics with an early alert that a railcar that may benefit from a remediation operation will reach a particular location at a particular time based on the route information.

At block 1606, the process 1600 involves the notice module 316 generating and sending remediation instructions for the train based on the defect or condition and route information of the railcar. In some examples, the remediation instructions may include rerouting a train to a depot that is near the current location of the train and along an easily accessible route. Additionally, the remediation instructions may include control instructions for the train. For example, the control instructions may instruct the train to stop immediately or to reduce speed immediately. In additional examples, the remediation instructions may include a parts list for completing any necessary repairs to the railcar. In an additional example, the remediation instructions may also include instructions for automated railcar repair systems to perform a repair on the railcar. Other remediation instructions may also be included in the remediation instructions. For example, the remediation operations may include logging a defect or condition for future consideration or analysis, ordering a replacement part for a defective component through an online ordering system, sending a signal to field camera system 20 at subsequent locations along the railway to focus on a particular defect or condition for confirmation of the defect, alerting emergency personnel and providing a location of the train (e.g., if the defect or condition is urgent or serious), or any other remediation operations that may be deployed to address the identified defect or condition.

Figure 17:
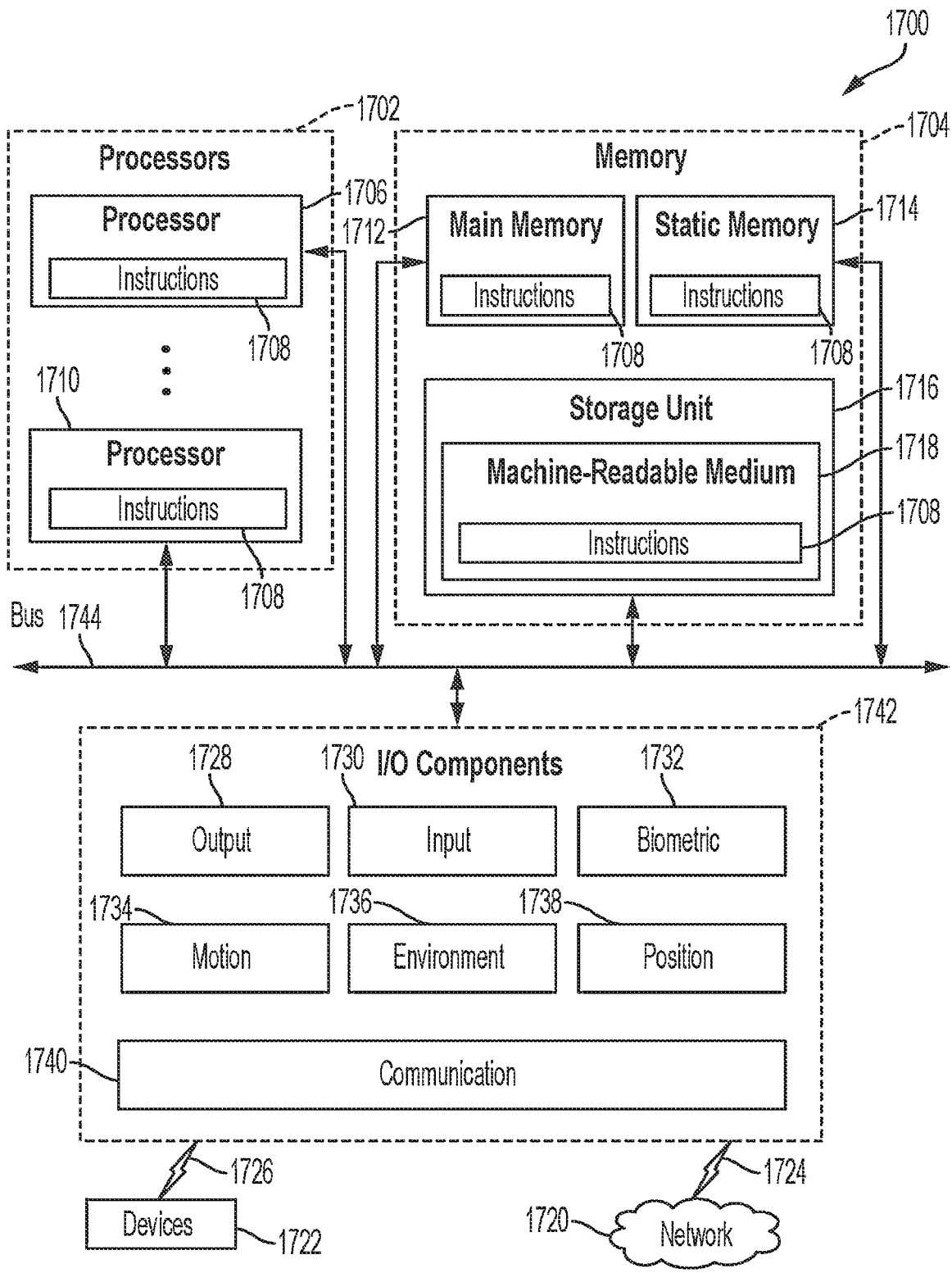
FIG. 17 is a diagrammatic representation of an example hardware configuration for a computing device such as a server, according to one aspect of the present disclosure.

FIG. 17 is a diagrammatic representation of an example hardware configuration for a computing machine 1700. The machine 1700, as shown, includes one or more processors 1702, memory elements 1704, and input-output components 1742, all connected by a bus 1744. The instructions 1708 (e.g., software, a program, an application, an applet, an app, or other executable code) cause the machine 1700 to perform any one or more of the methodologies described herein. For example, the instructions 1708 may cause the machine 1700 to execute any one or more of the methods and applications described herein. The instructions 1708 transform the general, non-programmed machine 1700 into a particular machine 1700 that is programmed to carry out the described and illustrated functions in the manner described.

The machine 1700 may operate as a standalone device or may be coupled (i.e., networked) to other machines. In a networked deployment, the machine 1700 may operate in the capacity of a server machine or a client machine in a server-client network environment, or as a peer machine in a peer-to-peer (or distributed) network environment. In a networked and edge computing deployment, a number of machines 1700 may be configured and located in the field, where each machine 1700 operates as an edge server in the network. The machine 1700 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1708, sequentially or otherwise, that specify actions to be taken by the machine 1700. Further, while only a single machine 1700 is illustrated, the term "machine" shall also be taken to include a collection of machines that individually or jointly execute the instructions 1708 to perform any one or more of the methodologies discussed herein.

The machine 1700 may include processors 1702, memory 1704, and input/output (I/O) components 1742, which may be configured to communicate with each other via a bus 1744. In an example, the processors 1702 (e.g., a Central Processing Unit (CPU), a Graphics Processing Unit (GPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 1706 and a processor 1710 that execute the instructions 1708. The term "processor" is intended to include multi-core processors that may comprise two or more independent processors (sometimes referred to as "cores") that may execute instructions contemporaneously. The machine 1700 may include a single processor with a single core, a single processor with multiple cores (e.g., a multi-core processor), multiple processors with a single core, multiple processors with multiples cores, or any combination thereof.

The memory 1704 includes a main memory 1712, a static memory 1714, and a storage unit 1716, both accessible to the processors 1702 via the bus 1744. The main memory 1704, the static memory 1714, and storage unit 1716 store the instructions 1708 embodying any one or more of the methodologies or functions described herein. The instructions 1708 may also reside, completely or partially, within the main memory 1712, within the static memory 1714, within machine-readable medium 1718 (e.g., a non-transitory machine-readable storage medium) within the storage unit 1716, within at least one of the processors 1702 (e.g., within the processor's cache memory), or any suitable combination thereof, during execution thereof by the machine 1700.

Furthermore, the machine-readable medium 1718 is non-transitory (in other words, not having any transitory signals) in that it does not embody a propagating signal. However, labeling the machine-readable medium 1718 "non-transitory" should not be construed to mean that the medium is incapable of movement; the medium should be considered as being transportable from one physical location to another. Additionally, since the machine-readable medium 1718 is tangible, the medium may be a machine-readable device.

The I/O components 1742 may include a wide variety of components to receive input, provide output, produce output, transmit information, exchange information, capture measurements, and so on. The specific I/O components 1742 that are included in a particular machine will depend on the type of machine. For example, portable machines such as mobile phones may include a touch input device or other such input mechanisms, while a headless server machine will likely not include such a touch input device. It will be appreciated that the I/O components 1742 may include many other components that are not shown in the figures. In various examples, the I/O components 1742 may include output components 1728 and input components 1730. The output components 1728 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, a resistance feedback mechanism), other signal generators, and so forth. The input components 1730 may include alphanumeric input components (e.g., a keyboard, a touch screen configured to receive alphanumeric input, a photo-optical keyboard, or other alphanumeric input components), pointing-based input components (e.g., a mouse, a touchpad, a trackball, a joystick, a motion sensor, or another pointing instrument), tactile input components (e.g., a physical button, a touch screen that provides location, force of touches or touch gestures, or other tactile input components), audio input components (e.g., a microphone), and the like.

In further examples, the I/O components 1742 may include biometric components 1732, motion components 1734, environmental components 1736, or position components 1738, among a wide array of other components. For example, the biometric components 1732 include components to detect expressions (e.g., hand expressions, facial expressions, vocal expressions, body gestures, or eye tracking), measure bio-signals (e.g., blood pressure, heart rate, body temperature, perspiration, or brain waves), identify a person (e.g., voice identification, retinal identification, facial identification, fingerprint identification, or electroencephalogram-based identification), and the like. The motion components 1734 include acceleration sensor components (e.g., accelerometer), gravitation sensor components, rotation sensor components (e.g., gyroscope), and so forth. The environmental components 1736 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1738 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1742 further include communication components 1740 operable to couple the machine 1700 to a network 1720 or to other devices 1722. For example, the communication components 1740 may include a network interface component 1724 or another suitable device to interface with a network 1720 (e.g., a wide-area network (WAN) or a public network such as the internet). Another type of interface 1726 may be used to interface with other devices 1722, which may be another machine or any of a wide variety of peripheral devices (e.g., a peripheral device coupled via a USB). In further examples, the communication components 1740 may include wired communication components, wireless communication components, cellular communication components, Near-field Communication (NFC) components, Bluetooth® components (e.g., Bluetooth® Low Energy), Wi-Fi® components, and other components to provide communication via other modalities.

Moreover, the communication components 1740 may detect identifiers or include components operable to detect identifiers. For example, the communication components 1740 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1740, such as location via Internet Protocol (IP) geolocation, location via Wi-Fi® signal triangulation, location via detecting an NFC beacon signal that may indicate a particular location, and so forth.

The various memories (e.g., memory 1704, main memory 1712, static memory 1714, memory of the processors 1702), storage unit 1716 may store one or more sets of instructions and data structures (e.g., software) embodying or used by any one or more of the methodologies or functions described herein. These instructions (e.g., the instructions 1708), when executed by processors 1702, cause various operations to implement the disclosed examples.

The instructions 1708 may be transmitted or received over the network 1720, using a transmission medium, via a network interface device (e.g., a network interface component included in the communication components 1740) and using any one of a number of well-known transfer protocols (e.g., hypertext transfer protocol (HTTP)). Similarly, the instructions 1708 may be transmitted or received using a transmission medium via the coupling 1726 (e.g., a peer-to-peer coupling) to the devices 1722.

Figure 18:
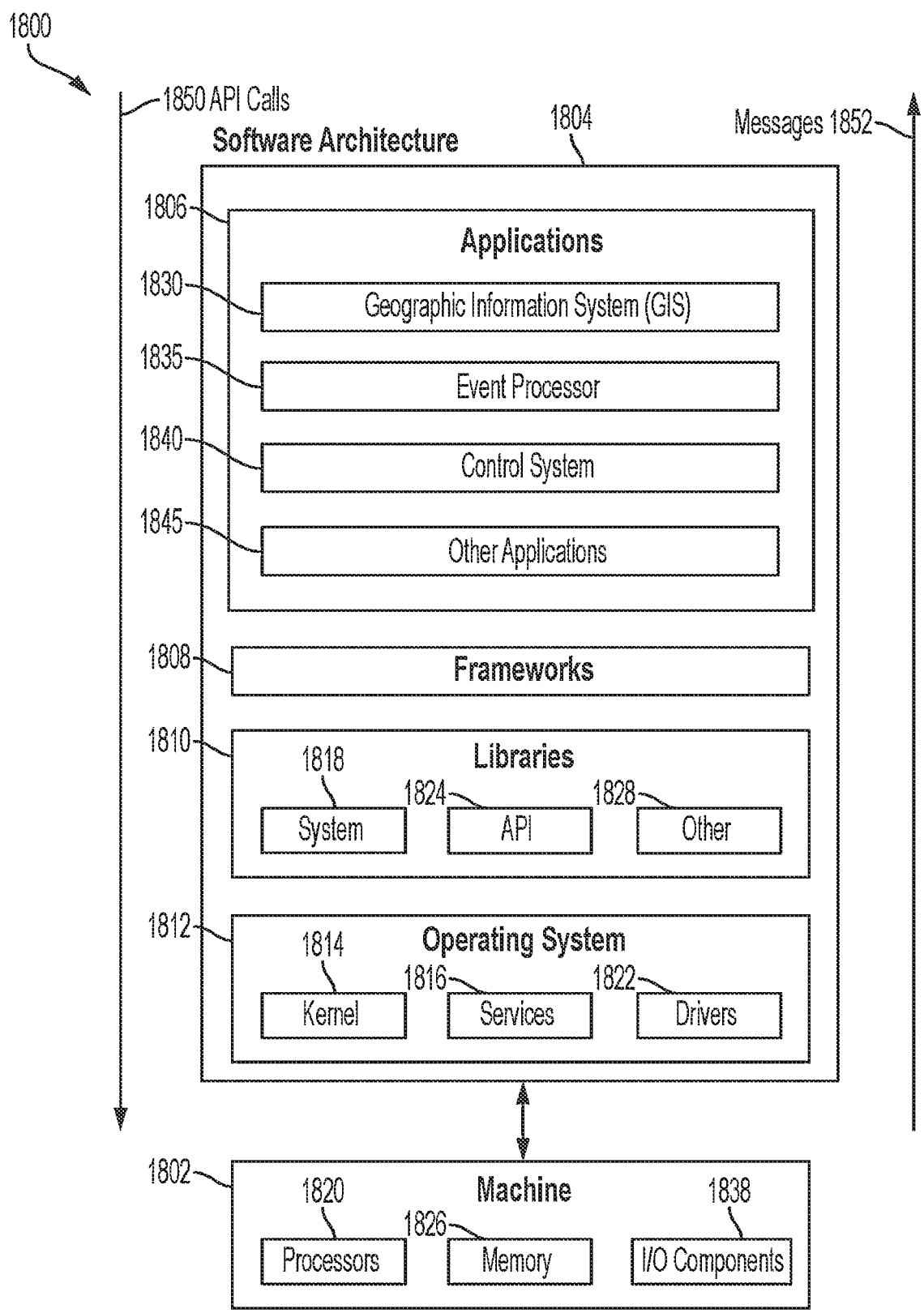
FIG. 18 is block diagram of an example software architecture suitable for use with the systems and methods described herein, according to one aspect of the present disclosure.

FIG. 18 is block diagram 1800 illustrating an example software architecture 1804. The software architecture 1804 is supported by hardware such as a machine 1802 that includes processors 1820, memory 1826, and I/O components 1838. In this example, the software architecture 1804 can be conceptualized as a stack of layers, where each layer provides a particular functionality. The software architecture 1804 includes layers such as applications 1806, frameworks 1808, libraries 1810, and an operating system 1812.

Operationally, the applications 1806 invoke API calls 1850 through the software stack and receive messages 1852 in response to the API calls 1850. An application programming interface (API) in some instances is a software-based intermediary that allows devices or applications to communicate with others. Different APIs can be designed and built for specific purposes. An API Call 1850 is a query or request for information. For example, a mobile device may execute and send an API Call 1850 to a particular application on the mobile device, which processes the query and returns a result (referred to as an API Message 1852). In another example, a server may send an API Call 1850 requesting the configuration attributes associated with a particular application to a remote mobile device, which processes the query and returns a result including the attributes to the server. The term API is also used sometimes to describe discrete functions or features associated with an application.

The operating system 1812 manages hardware resources and provides common services. The operating system 1812 includes, for example, a kernel 1814, services 1816, and drivers 1822. The kernel 1814 acts as an abstraction layer between the hardware and the other software layers. For example, the kernel 1814 provides memory management, processor management (e.g., scheduling), component management, networking, and security settings, among other functionality. The services 1816 can provide other common services for the other software layers. The drivers 1822 are responsible for controlling or interfacing with the underlying hardware. For instance, the drivers 1822 can include display drivers, camera drivers, Bluetooth® or Bluetooth® Low Energy (BLE) drivers, flash memory drivers, serial communication drivers (e.g., Universal Serial Bus (USB) drivers), Wi-Fi® drivers, audio drivers, power management drivers, and so forth.

The libraries 1810 provide a low-level common infrastructure used by the applications 1806. The libraries 1810 can include system libraries 1818 (e.g., C standard library) that provide functions such as memory allocation functions, string manipulation functions, mathematic functions, and the like. In addition, the libraries 1810 can include API libraries 1824 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQL or SQLite to provide various relational database functions), web libraries (e.g., a WebKit® engine to provide web browsing functionality), and the like. The libraries 1810 can also include a wide variety of other libraries 1828 to provide many other APIs to the applications 1806.

The frameworks 1808 provide a high-level common infrastructure that is used by the applications 1806. For example, the frameworks 1808 provide various graphical user interface (GUI) functions, high-level resource management, and high-level location services. The frameworks 1808 can provide a broad spectrum of other APIs that can be used by the applications 1806, some of which may be specific to a particular operating system or platform.

In an example, the applications 1806 include a geographic information system 1030, an event processor 1835, a control system 1840, and other applications 1845. Various programming languages can be employed to create one or more of the applications 1806, structured in a variety of manners, such as object-oriented programming languages (e.g., Objective-C, Java, or C++) or procedural programming languages (e.g., C or assembly language).

Any of the functionality described herein can be embodied in one or more computer software applications or sets of programming instructions, as described herein. According to some examples, "function," "functions," "application," "applications," "instruction," "instructions," or "programming" are program(s) that execute functions defined in the programs. Various programming languages can be employed to develop one or more of the applications, structured in a variety of manners, such as object-oriented programming languages (e.g., Objective-C, Java, or C++) or procedural programming languages (e.g., C or assembly language). In a specific example, a third-party application (e.g., an application developed using the ANDROID™ or IOS™ software development kit (SDK) by an entity other than the vendor of the particular platform) may include mobile software running on a mobile operating system such as IOS™, ANDROID™, WINDOWS® Phone, or another mobile operating systems. In this example, the third-party application can invoke API calls provided by the operating system to facilitate functionality described herein.

Hence, a machine-readable medium may take many forms of tangible storage medium. Non-volatile storage media include, for example, optical or magnetic disks, such as any of the storage devices in any computer devices or the like, such as may be used to implement the client device, media gateway, transcoder, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code or data. Many of these forms of computer readable media may be involved in carrying one or more sequences of one or more instructions to a processor for execution.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as plus or minus ten percent from the stated amount or range.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

While the foregoing has described what are considered to be the best mode and other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A computer-implemented method in which one or more processing devices perform operations comprising:
    training a defect detection system to identify defects in moving railcars by at least:
    obtaining a plurality of raw images depicting railcars;
    generating a first plurality of secondary images using at least the plurality of raw images, wherein the first plurality of secondary images is generated by applying image augmenting operations to the plurality of raw images;
    curating a first training dataset comprising images from the plurality of raw images and the first plurality of secondary images;
    training a first machine-learning algorithm with the first training dataset; and
    training a second machine-learning algorithm with a second training dataset comprising images from the plurality of raw images and a second plurality of secondary images;
    capturing, via a field camera system, a plurality of field images of a moving railcar travelling along a railway, at least one of the plurality of field images showing the moving railcar from a first angle and at least one other of the plurality of field images showing the moving railcar from a second angle that is different from the first angle;
    for each particular field image of the plurality of field images:
        applying the first machine-learning algorithm to the particular field image to generate one or more first machine-learning algorithm outputs;
        applying the second machine-learning algorithm to at least one of the one or more first machine-learning algorithm outputs to generate one or more second machine-learning algorithm outputs; and
        generating, based at least in part on at least one of the one or more second machine-learning algorithm outputs, a defect determination corresponding to the particular field image;
    detecting a defect of the moving railcar based at least in part on a plurality of defect determinations corresponding to the plurality of field images; and
    in response to detecting the defect, performing one or more remediation operations comprising at least one of:
        instructing a reduction of a travel speed of the moving railcar; or
        instructing a re-routing of the moving railcar.

2. The computer-implemented method of claim 1, wherein at least one of the first angle or the second angle corresponds to a side view of the moving railcar, a view of one or more wheels of the moving railcar, a view of a body of the moving railcar, a view of a coupling system between the moving railcar and an adjacent moving railcar, a view of one or more air hoses, a view of an undercarriage of the moving railcar, a view of one or more axles of the moving railcar, a view of one or more springs of the moving railcar, or a view of one or more braking systems of the moving railcar.

3. The computer-implemented method of claim 1, wherein at least one of the first angle or the second angle corresponds to aerial imaging collected by a drone system.

4. The computer-implemented method of claim 1, wherein the plurality of field images comprises field images collected at different locations along a railway.

5. The computer-implemented method of claim 4 further comprising:
    in response to detecting the defect of the moving railcar, outputting instructions for a subsequent field camera system to collect one or more subsequent field images to confirm detection of the defect.

6. The computer-implemented method of claim 5, wherein the instructions to the subsequent field camera system include instructions to focus imaging on a particular defect.

7. The computer-implemented method of claim 1, wherein at least one of the first machine-learning algorithm or the second machine-learning algorithm comprises a localization algorithm, a classification algorithm, a pose estimation algorithm, a line segment detection algorithm, or a segmentation algorithm.

8. The computer-implemented method of claim 1, further comprising:
    generating a plurality of synthetic images using the plurality of raw images,
    wherein at least one of the first training dataset or the second training dataset further comprises the plurality of synthetic images.

9. The computer-implemented method of claim 1, wherein:
    the operations further comprise performing a post-processing operation on at least one of the one or more second machine-learning algorithm outputs to generate one or more post-processed machine-learning algorithm outputs; and
    detecting the defect of the moving railcar is based at least in part on the one or more post-processed machine-learning algorithm outputs.

10. The computer-implemented method of claim 1, wherein the plurality of field images comprises (i) one or more side views of the moving railcar or a portion thereof and (ii) one or more undercarriage views of the moving railcar or a portion thereof.

11. The computer-implemented method of claim 1, wherein performing the one or more remediation operations further comprises at least one of:
    ordering one or more replacement components associated with the defect;
    initiating one or more additional inspections at one or more subsequent inspection locations; or alerting an emergency response group of the defect and a location of the moving railcar.

12. A system comprising:
a field camera system;
one or more processors in electrical communication with the field camera system; and
a non-transitory computer-readable medium having instructions stored thereon, the instructions being executable by at least one processor of the one or more processors for performing operations comprising:
training a defect detection system to identify defects in moving railcars by at least:
obtaining a plurality of raw images depicting railcars;
generating a first plurality of secondary images using the plurality of raw images;
curating a first training dataset comprising images from the plurality of raw images and the first plurality of secondary images;
training a first machine-learning algorithm with the first training dataset; and
training a second machine-learning algorithm with a second training dataset comprising images from the plurality of raw images and a second plurality of secondary images;
instructing the field camera system to capture a plurality of field images of a moving railcar travelling along a railway, at least one of the plurality of field images showing the moving railcar from a first angle and at least one other of the plurality of field images showing the moving railcar from a second angle that is different from the first angle;
for each particular field image of the plurality of field images:
applying the first machine-learning algorithm to the particular field image to generate one or more first machine-learning algorithm outputs;
applying the second machine-learning algorithm to at least one of the one or more first machine-learning algorithm outputs to generate one or more second machine-learning algorithm outputs; and
generating, based at least in part on at least one of the one or more second machine-learning algorithm outputs, a defect determination corresponding to the particular field image;
detecting a defect of the moving railcar based at least in part on a plurality of defect determinations corresponding to the plurality of field images; and
in response to detecting the defect, performing one or more remediation operations comprising at least one of:
instructing a reduction of a travel speed of the moving railcar; or
instructing a re-routing of the moving railcar.

13. The system of claim 12, wherein at least one of the first angle or the second angle corresponds to a side view of the moving railcar, a view of one or more wheels of the moving railcar, a view of a body of the moving railcar, a view of a coupling system between the moving railcar and an adjacent moving railcar, a view of one or more air hoses, a view of an undercarriage of the moving railcar, a view of one or more axles of the moving railcar, a view of one or more springs of the moving railcar, or a view of one or more braking systems of the moving railcar.

14. The system of claim 12, wherein at least one of the first angle or the second angle corresponds to aerial imaging collected by a drone system.

15. The system of claim 12, wherein the plurality of field images comprises field images collected at different locations along a railway.

16. The system of claim 15, wherein the operations further comprise:
in response to detecting the defect of the moving railcar, outputting instructions for a subsequent field camera system to collect one or more subsequent field images to confirm detection of the defect.

17. The system of claim 16, wherein the instructions to the subsequent field camera system include instructions to focus imaging on a particular defect.

18. The system of claim 12, wherein at least one of the first machine-learning algorithm or the second machine-learning algorithm comprises a localization algorithm, a classification algorithm, a pose estimation algorithm, a line segment detection algorithm, or a segmentation algorithm.

19. A non-transitory computer-readable storage medium having program code that is stored thereon, the program code being executable by one or more processing devices for performing operations comprising:
training a defect detection system to identify defects in moving railcars by at least:
obtaining a plurality of raw images depicting railcars;
generating a plurality of synthetic images using the plurality of raw images;
curating a first training dataset comprising images from the plurality of raw images and the plurality of synthetic images;
training a first machine-learning algorithm with the first training dataset; and
training a second machine-learning algorithm with a second training dataset comprising images from the plurality of raw images and the plurality of synthetic images;
instructing a field camera system to capture a plurality of field images of a moving railcar travelling along a railway, at least one of the plurality of field images showing the moving railcar from a first angle and at least one other of the plurality of field images showing the moving railcar from a second angle that is different from the first angle;
for each particular field image of the plurality of field images:
applying the first machine-learning algorithm to the particular field image to generate one or more first machine-learning algorithm outputs;
applying the second machine-learning algorithm to at least one of the one or more first machine-learning algorithm outputs to generate one or more second machine-learning algorithm outputs; and
generating, based at least in part on at least one of the one or more second machine-learning algorithm outputs, a defect determination corresponding to the particular field image;
detecting a defect of the moving railcar based at least in part on a plurality of defect determinations corresponding to the plurality of field images; and
in response to detecting the defect, performing one or more remediation operations comprising at least one of:
instructing a reduction of a travel speed of the moving railcar; or
instructing a re-routing of the moving railcar.

20. The non-transitory computer-readable storage medium of claim 19, wherein at least one of the first angle or the second angle corresponds to a side view of the moving railcar, a view of one or more wheels of the moving railcar, a view of a body of the moving railcar, a view of a coupling system between the moving railcar and an adjacent moving railcar, a view of one or more air hoses, a view of an undercarriage of the moving railcar, a view of one or more axles of the moving railcar, a view of one or more springs of the moving railcar, or a view of one or more braking systems of the moving railcar.

21. The non-transitory computer-readable storage medium of claim 19, wherein the plurality of field images comprises field images collected at different locations along a railway.

22. The non-transitory computer-readable storage medium of claim 21, wherein the operations further comprise:
   in response to detecting the defect of the moving railcar, outputting instructions for a subsequent field camera system to collect one or more subsequent field images to confirm detection of the defect.

23. The non-transitory computer-readable storage medium of claim 22, wherein the instructions to the subsequent field camera system include instructions to focus imaging on a particular defect.

* * * * *